(12) United States Patent
Iwanaga

(10) Patent No.: US 7,091,972 B2
(45) Date of Patent: Aug. 15, 2006

(54) IMAGE GENERATION OF SHADOWS UTILIZING A MODIFIER VOLUME GAP REGION

(75) Inventor: Yoshihito Iwanaga, Kawasaki (JP)

(73) Assignee: Namco Bandai Games INC, Tokyo (JP)

( * ) Notice: Subject to any disclaimer, the term of this patent is extended or adjusted under 35 U.S.C. 154(b) by 290 days.

(21) Appl. No.: 10/359,232

(22) Filed: Feb. 6, 2003

(65) Prior Publication Data

US 2003/0156109 A1   Aug. 21, 2003

(30) Foreign Application Priority Data

Feb. 15, 2002   (JP)   ............... 2002-038640

(51) Int. Cl.
*G06T 15/50* (2006.01)
*G06T 15/00* (2006.01)
*G06T 15/60* (2006.01)

(52) U.S. Cl. ...................... 345/426; 345/419

(58) Field of Classification Search .............. 345/419, 345/426, 619, 647

See application file for complete search history.

(56) References Cited

U.S. PATENT DOCUMENTS

| | | | | |
|---|---|---|---|---|
| 5,943,164 A | * | 8/1999 | Rao | ........................... 359/462 |
| 6,034,695 A | * | 3/2000 | Silva et al. | ................. 345/619 |
| 6,290,604 B1 | * | 9/2001 | Miyamoto et al. | ............ 463/30 |
| 6,677,946 B1 | * | 1/2004 | Ohba | ......................... 345/426 |
| 6,806,875 B1 | * | 10/2004 | Nakatsuka et al. | ......... 345/426 |
| 2002/0175914 A1 | * | 11/2002 | Marshall et al. | ............ 345/426 |
| 2004/0027348 A1 | * | 2/2004 | Fenney | ....................... 345/421 |

OTHER PUBLICATIONS

Watt, Alan and Watt, Mark, "Advanced Animation and Rendering Techniques", pp. 24-25 and 158-166, Addison-Wesley Professional; 1st edition (Oct. 31, 1992).*
Crow, F.C., "Shadow Algorithms for Computer Graphics", pp. 242-247, SIGGRAPH '77, Jul. 20-22.*
Foley et al. "Computer Graphics: Principles and Practice", 2nd ed in C, pp. 749-750, Jul. 1996.*
Steven Elliot, Phillip Miller, et al., "Inside 3D Studio Max 2, vol. 1", 1998 New Riders, pp. 252-255.*

* cited by examiner

*Primary Examiner*—Ulka Chauhan
*Assistant Examiner*—Daniel F. Hajnik
(74) *Attorney, Agent, or Firm*—Oliff & Berridge PLC

(57) ABSTRACT

Based on the information of an object OB, a modifier volume MV for that object is set, the set modifier volume MV being then used to change an attribute. A gap region GR is then provided between the object OB and the modifier volume MV. The gap length GL of the gap region GR is changed depending on the distance H between the object OB and a projection plane PP (GL being increased as H increases). A modifier volume is drawn after a background and a plurality of model objects have been drawn. Thus, the shadow of a first model object is drawn to fall on a second model object while preventing the self-shadow of the first model object from falling on the first model object itself.

18 Claims, 28 Drawing Sheets

MOB

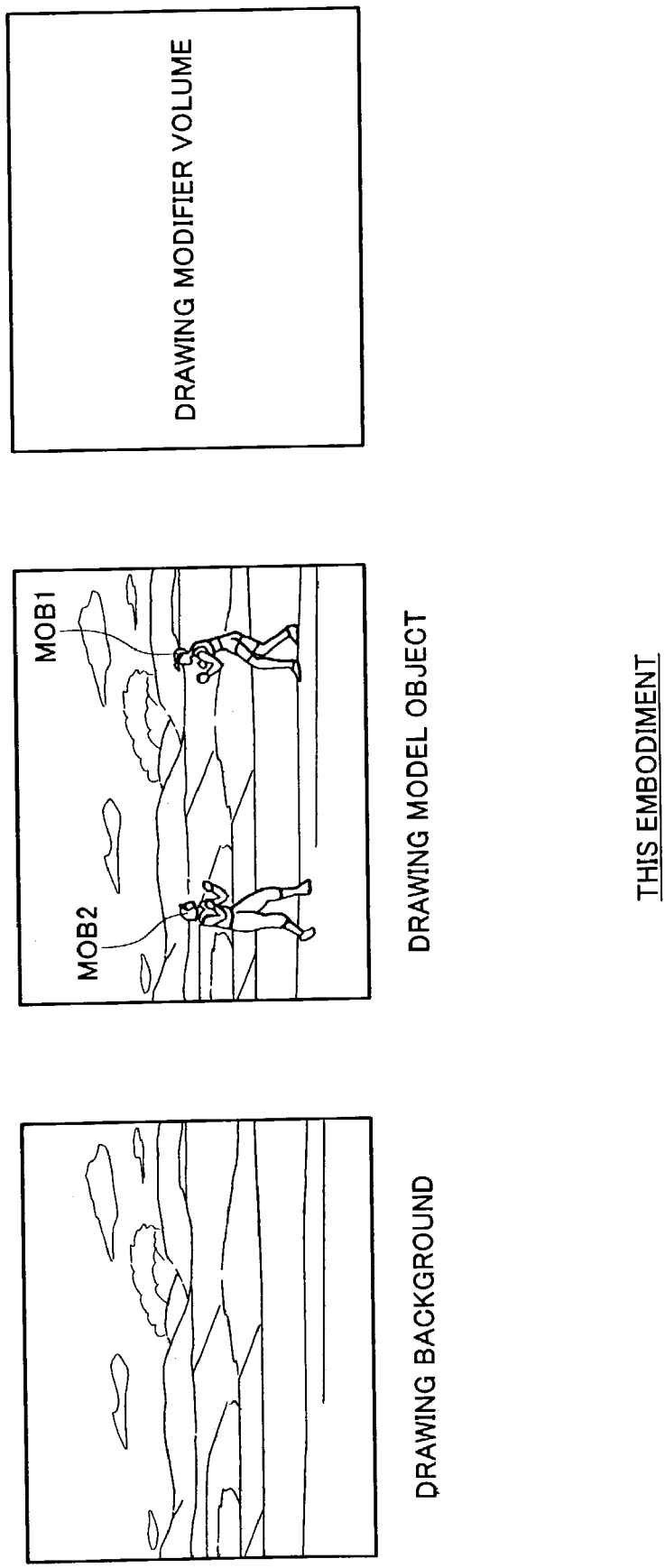

FIG. 19
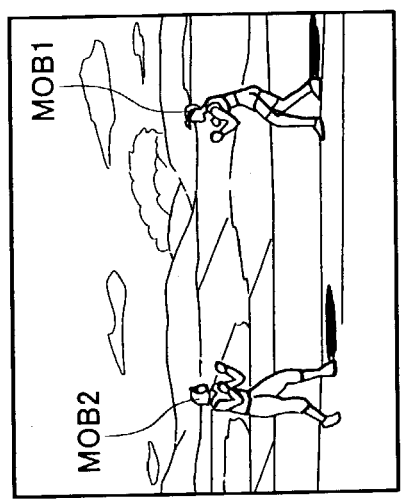
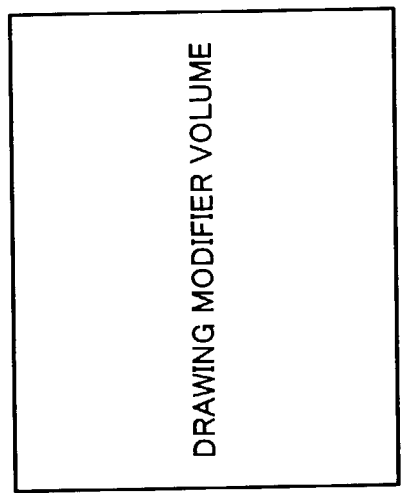
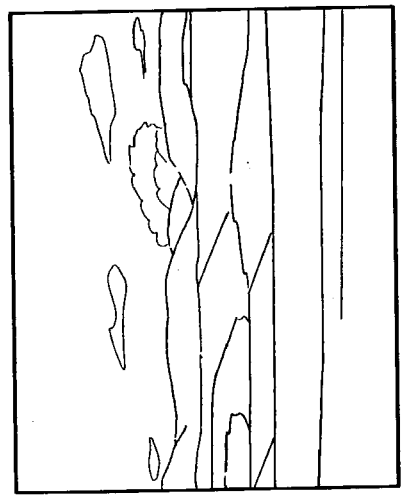
COMPARATIVE EXAMPLE

IMAGE GENERATION OF SHADOWS UTILIZING A MODIFIER VOLUME GAP REGION

Japanese patent application No. 2002-38640 filed on Feb. 15, 2002 is hereby incorporated by reference in its entirety.

BACKGROUND OF THE INVENTION

The present invention relates to an image generating method, a program and an information storage medium.

Conventionally, there is known an image generating method for generating an image visible from a virtual camera (or a given viewpoint) in an object space that is a virtual three-dimensional space. It is highly popular as a method by which a so-called virtual reality can be experienced. If it is assumed that a fight game can be enjoyed by an image generating system, a player uses a game controller (or control section) to cause a player's character (or object) to fight against an enemy character which is controlled by another player or a computer.

In such an image generating method, it is desirable that a model object such as character or the like can be generated to have its realistic shadow. There is known one shadow generating technique which uses a modifier volume (which in a narrow sense, is a shadow volume).

However, it has been found that the technique using such a modifier volume may draw the self-shadow of a character to fall onto the character itself. If any other shading has already been done against that character and when such a self-shadow is drawn to fall on the character itself, the quality of a generated image will be degraded.

BRIEF SUMMARY OF THE INVENTION

One aspect of the present invention relates to an image generating method of generating an image which is visible from a given viewpoint in an object space, comprising:

setting a modifier volume for an object based on information of the object;

performing attribute changing process to a space specified by the modifier volume, based on the set modifier volume; and setting the modifier volume so that a gap region is formed between the object and the modifier volume.

BRIEF DESCRIPTION OF THE SEVERAL VIEWS OF THE DRAWING

FIG. 17 illustrates the order of drawing according to the embodiment.

FIG. 19 illustrates the order of drawing according to a comparative example.

DETAILED DESCRIPTION OF THE EMBODIMENT

Figure 1:
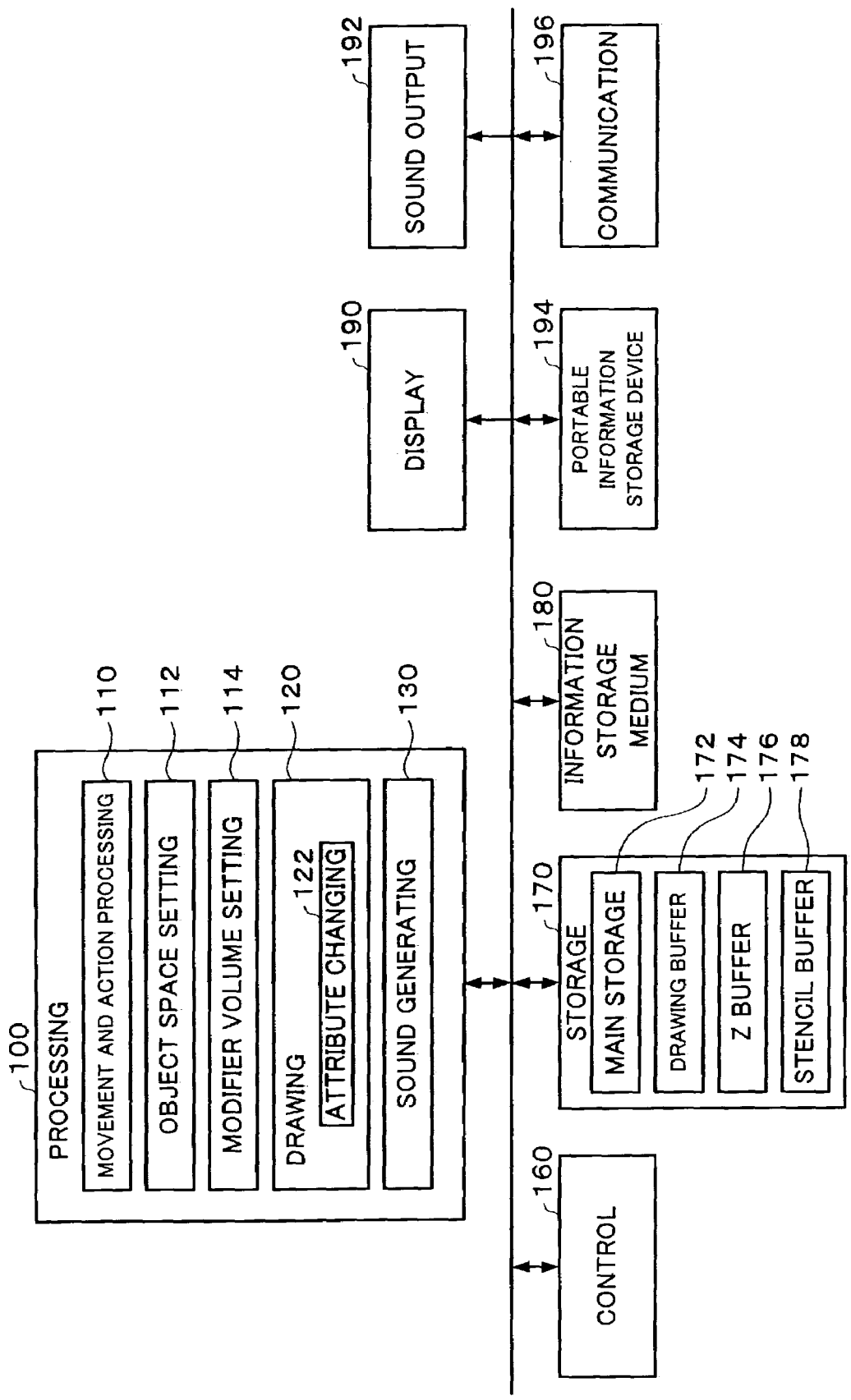
FIG. 1 is an example of functional block diagram of an image generating system according to an embodiment of the present invention.

This embodiment will now be described.

Note that this embodiment described in the following is not intended to unduly limit the subject matter of the invention as defined in the accompanying claims. In addition, all of the components described in connection with this embodiment are not necessarily essential for the present invention.

One embodiment of the present invention relates to an image generating method of generating an image which is visible from a given viewpoint in an object space, comprising:

setting a modifier volume for an object based on information of the object;

performing attribute changing process to a space specified by the modifier volume, based on the set modifier volume; and setting the modifier volume so that a gap region is formed between the object and the modifier volume.

In this embodiment, the modifier volume of the object is set based on the information of that object (e.g., vertex information, location information or direction information).

For example, the object may be deformed by moving the vertexes of the object (or an object shaped three-dimensionally and defined as a closed surface model) in a direction of a first vector, then the deformed object is set as the modifier volume. Alternatively, the modifier volume is set by determining a primitive face enclosing a projected image obtained by projecting an object onto a given plane (or a plane perpendicular to the first vector) and elongating the vertexes of that primitive face in the direction of the first vector. Alternatively, the modifier volume is set by determining an edge (or outline) of the object as viewed from the direction of the first vector and elongating that edge (or vertexes forming the edge) in the direction of the first vector. In this embodiment, the modifier volume thus set is used to perform an attribute changing process (such as brightness reduction process, brightness increase process, or texture changing process) relating to a space specified by the modifier volume (e.g., a space within the modifier volume or a space outside the modifier volume).

In this embodiment, a gap region is formed between the object and the set modifier volume. By forming such a gap region, the object itself can be prevented from being influenced by the attribute changing process from the modifier volume, thereby generating an object image with an improved quality.

It is also possible to omit the attribute changing process in this embodiment.

In this embodiment, a gap length of the gap region may be changed according to a distance between the object and a first plane.

In this case, the distance between the object (or its representative point, a vertex or a point specified by the vertex) and the first plane may include a parameter mathematically equivalent to this distance. Furthermore, the relationship between this distance and the gap length may be linear or non-linear.

Additionally, in this embodiment, the gap length of the gap region may be increased as the distance between the object and the first plane increases.

Thus, the gap length in an object farther distant from the first plane may be increased. This may block the influence of the attribute changing process in an object by the modifier volume, for example, from any other objects belonging to the same model object as the first-mentioned object.

The gap length may also be decreased as the distance between the object and the first plane increases.

In this embodiment, a background and a plurality of model objects maybe drawn, and then the modifier volume corresponding to each of the model objects may be drawn.

For example, thus, the attribute changing process of the modifier volume relating to a first model object may influence a second model object while protecting the first model object itself against that attribute changing process.

Such drawing process in such an order can be performed by a drawing section (or an image generating section), for example.

In this embodiment, vertexes of the object shaped three-dimensionally maybe moved in a direction of a given first vector in a manner that moving distance of the vertexes differing from one another, so as to deform the object in the direction of the first vector, and the deformed object is set as the modifier volume.

In this embodiment, each vertex in the three-dimensionally shaped object moves through a different moving distance in the first vector direction. The object is deformed by this vertex movement and set as a modifier volume. In this case, the object itself deformed by this vertex movement may be set as a modifier volume. The further deformed object may be set as a modifier volume.

Thus, the reduction of processing load and the simplification of process can be accomplished since the modifier volume can be set by moving the vertexes of the object.

In this embodiment, each of the vertexes of the object may be moved in a manner that the moving distance of each of the vertexes becomes larger as an angle between the first vector and a normal vector of each of the vertexes of the object becomes smaller.

In this case, the normal vector in the vertex includes a parameter mathematically equivalent to the normal vector applied to the vertex. The normal vector in the vertex may not necessarily be oriented in coincident with the face of the object. The angle included between the first vector and the normal vector may include a parameter mathematically equivalent to this angle. The relationship between this angle and the vertex moving distance may be linear or non-linear.

In this embodiment, the moving distance of each of the vertexes may be increased as a distance between a representative point of the object or each of the vertexes and the first plane increases.

In this case, the distance between the representative point or vertex of the object and the first plane may include a parameter mathematically equivalent to this distance. Additionally, the relationship between this distance and the vertex moving distance may be linear or non-linear.

In this embodiment, vertexes of the object may be moved so that $Q=P+H\times(K\times IP+1)\times VS$ is satisfied where P (PX, PY, PZ) represents coordinates of each of the vertexes before being moved; Q (QX, QY, QZ) represents coordinates of each of the vertexes after being moved; VS (VSX, VSY, VSZ) represents a first vector; IP represents an inner product between the first vector and a normal vector of each of the vertexes of the object; K represents a coefficient to be multiplied by IP; and H represents a distance parameter between a representative point of the object or each of the vertexes and a first plane.

In this case, the inner product IP and distance parameter H may include parameters mathematically equivalent to them. The distance parameter H may be the distance itself or a further transformed distance. Alternatively, some vertex(s) may not be subjected to the movement processing according to the above relational expression $Q=P+H\times(K\times IP+1)\times VS$. In place of the above relational expression, $Q=P+H\times(K\times IP+1)\times VS$, such a relational expression as being $Q=P+H\times F(IP)\times VS$ (where F(IP) is a function having an argument IP) may be taken.

In this embodiment, the coefficient K may be set at a value larger than one.

It is thus possible to increase the width of the modifier volume (in the minor axis direction).

In this embodiment, values of the inner products IP may be clamped within a given range.

It is thus possible to control the gap length of the gap region provided between the object and the modifier volume through a simplified procedure.

This embodiment will now be described in further details with reference to the drawing.

1. Configuration

A functional block diagram of an image generating system (game system) according to this embodiment is shown in FIG. 1. In this figure, this embodiment may include at least a processing section 100 (or at least the processing section 100 and a storage section 170), the remaining sections (or functional blocks) being configured by any one of various other components.

A control section 160 is designed to receive control data from a player, its function being able to be realized by hardware such as a lever, a button, a steering wheel, a shift lever, an accelerator pedal, a brake pedal, a microphone, a sensor or a housing.

A storage section 170 provides a work area for the processing section 100 and a communication section 196, its function being able to be realized by hardware such as RAM.

An information storage medium (or computer-readable medium) 180 is designed to store programs and data, its function being able to be realized by hardware such as a laser disk (such as CD or DVD), a magneto-optical disk (MO), a magnetic disk, a hard disk, a magnetic tape or a memory (ROM). The processing section 100 can perform various kinds of processes according to this embodiment, based on programs (or data) which have been stored in this information storage medium 180. In other words, the information storage medium 180 has stored (or recorded) a program for causing a computer to function various sections (or means) according to this embodiment or for realizing these sections through the computer.

A display section 190 is designed to output an image generated by this embodiment, its function being able to be realized by hardware such as CRT, LCD or HMD (head-mount display).

A sound output section 192 is designed to output a sound generated by this embodiment, its function being able to be realized by hardware such as speakers or headphones.

A portable information storage device 194 is designed to store a player's personal data or to save the game data and may be formed by a memory card or a portable game machine.

A communication section 196 is designed to performs various controls for communications between the game system and any other external instrument (or a hose device or another image generating system), its function being able to be realized by hardware such as various kinds of processors or ASIC or programs.

The program for causing a computer to function as the respective sections (or means) according to this embodiment may be distributed from the information storage medium possessed by a host device (or server) through a network or communication section 196 into the information storage medium 180 (or storage section 170). Use of an information storage medium in such a host device (or server) is also included within the scope of the present invention.

The processing section (or processor) 100 is designed to perform various processings such as game processing, image generating or sound generating, based on the operational data and program from the control section 160. In this case, the processing section 100 employs a main storage section 172 in the storage section 170 as a work area to execute various processings. The function of this processing section 100 can be realized by hardware such as various types of processors (CPU or DSP) or ASIC (or gate array) or through any suitable program (or game program).

It is to be understood herein that the processing section 100 may be designed to perform various processes such as coin (or charge) reception, setting of various modes, game proceeding, setting of scene selection, determination of the position and rotational angle (about X-, Y- or Z-axis) of an object (one or more primitive faces), motion processing of the object, determination of the viewpoint (or virtual camera's viewpoint) and view angle (or rotational angle of the virtual camera), arrangement of an object (or mapped object) within the object space, hit checking, computation of the game results (or scores), processing for causing a plurality of players to play in a common game space and game-over processing.

The processing section 100 comprises a movement/action processing section 110, an object space setting section 112, a modifier volume setting section 114, a drawing section 120 and a sound generating section 130. However, the processing section 100 does not necessarily include all of the section (or functional blocks), but some may be omitted.

The movement/action processing section 110 determines movement information (position and rotational angle) and action information (positions and rotational angles of object parts) relating to the object (or movable body). That is to say, the movement/action processing section 110 performs a processing of causing the object to move and/or act (motion and animation), based on control data inputted by the player through the control section 160 and/or a game program.

More particularly, the movement/action processing section 110 changes the position and/or rotational angle of the object (or movable body), for example, for each one frame (1/60 or 1/30 seconds). If it is now assumed that the position and rotational angle of an object for a frame (k−1) are respectively $Pk-1$ and $\theta k-1$ and that the positional and rotational amounts of change (velocity and rotational velocity) in the object for one frame are respectively $\Delta P$ and $\Delta \theta$, for example, the position ($Pk$, $\theta k$) and rotational angle of the object for frame k can be determined, for example, according to the following formulas (1) and (2):

$$Pk=Pk-1+\Delta P \quad (1)$$

$$\theta k=\theta k-1+\Delta \theta \quad (2)$$

The object space setting section 112 is designed to arrange various objects such as movable bodies (characters, motorcars, tanks and robots), posts, walls, buildings and maps (geometries) within the object space. These objects may be formed by primitive faces such as polygons, free-form surfaces or sub-division surfaces. More particularly, the object space setting section 112 determines the position and rotational angle (direction) of the object in the world coordinate system and then locates the object at that position (X, Y, Z) with that rotational angle (about X-, Y- and Z-axes).

The modifier volume setting section 114 sets (generates or arranges) a modifier volume (which is, in a narrow sense, a shadow volume). It is to be understood herein that the modifier volume is a volume (or virtual object) for specifying a space in which the attribute thereof is to be changed. It is defined, for example, as a closed surface model.

In this embodiment, the modifier volume setting section 114 deforms the object by moving (or translating) the vertexes of the three-dimensionally shaped object in the direction of first vector (which is, in a narrow sense, a projection vector). The deformed object (which may be further deformed in another manner) is set (or arranged) as a modifier volume.

The deformed object is defined, for example, as a closed surface model (such as an oval ball). Additionally, an object to be deformed may be a model object itself or may be one part object itself used to form the model object. Alternatively, it may be a bounding volume enclosing the model object and part objects (which is intended to mean a simple object approximating the shape of the model object or part object).

The modifier volume setting section 114 moves the vertexes of the object such that the moving distance thereof increases as an angle included between the first vertex and the normal vector of each vertex in the object (or the normal vector associated with that vertex to represent the orientation of the surface) decreases. Such an angle may include a parameter mathematically equivalent thereto. Furthermore, the moving (or translating) distance of the vertex may be increased as the distance (which may be in a straight line or in a vertical direction) between the representative point (or vertex) of the object and the first plane (which is, in a narrow sense, a projection plane) increases. Additionally, the modifier volume setting section 114 sets the modifier volume so that it intersects the first plane. More particularly, the modifier volume setting section 114 sets the modifier volume so that the representative point defined substantially as the central point of the modifier volume is located on the first plane.

The drawing section (or image generating section) 120 draws or generates an image based on the results of various processings at the processing section 100 and outputs it toward the display section 190. For example, if a so-called three-dimensional game image is to be generated, various geometry-processings such as coordinate transformation, clipping, perspective transformation and light-source computation are first carried out with the results thereof being then used to prepare drawing data (which may include the positional coordinates, texture coordinates, color (or brightness) data, normal vector or α-value that is provided to each vertex (or composing point) in a primitive face. Based on this drawing data (or primitive face data), the image of the geometry-processed object (which may consist of one or more primitive faces) is then drawn in a drawing buffer 174 (which may be a frame or work buffer for storing the image information by pixel section). Thus, an image visible from the virtual camera (or a given viewpoint) in the object space may be generated.

The sound generating section 130 performs a sound processing based on the results of various processings at the processing section 100 to generate game sounds such as BGMs, effect sounds or voices, which are in turn outputted toward the sound output section 192.

An attribute changing section 122 included in the drawing section 120 changes an attribute relating to a space specified by the modifier volume (which space may be within or outside the modifier volume). More particularly, the attribute changing process is carried out against the primitive (such as face, line, point or pixel) present in the space specified by the modifier volume.

It is to be understood herein that the attribute changing process may include a process of reducing the brightness in a shadow space (or darkening the brightness), a process of increasing the brightness in an illuminated space (or lightening the brightness) and a process of changing a texture to be mapped onto a primitive face. In addition to such processes, a process of changing various attributes (such as brightness, color, α-value, depth value, texture and normal vector) which are used to generate a CG (Computer Graphics) image may be considered.

The attribute changing section 122 performs the attribute changing process using, for example, a Z buffer 176 and a stencil buffer 178.

The Z buffer 176 is a buffer storing the depth value (z value). This Z buffer 176 enables a hidden-surface removal process. The stencil buffer 178 is a buffer that can perform a computation (addition, subtraction or inversion) against the stored values. By the use of this stencil buffer 178, a pre-specified computation can be carried out against a region on the stencil buffer 178 corresponding to the drawing region on the drawing buffer (frame buffer or work buffer) 174.

The image generating system of this embodiment may be dedicated for a single-player mode in which only a single player can play or may have a multi-player mode in which a plurality of players can play simultaneously.

If a plurality of players play a game, a single terminal may be used to generate game images and game sounds to be provided to these plural players. Alternatively, these game images and sounds may be generated through a plurality of terminals (game machines or cellular phones) which are interconnected through a network (or transmission line, telecommunication line).

2. Techniques in this Embodiment

The techniques in this embodiment will now be described with reference to the drawing.

Although this embodiment will mainly be described in connection with a fight game, this embodiment can broadly be applied to various kinds of games in addition to the fight game.

Although this embodiment will be described in connection with an attribute changing process for reducing the brightness to generate a shadow, this embodiment may similarly be applied to another attribute changing process, for example, for increasing the brightness or for changing the texture.

2.1 Generation of Modifier Volume

There are considered various techniques for generating (or setting) a modifier volume.

Figure 2A:
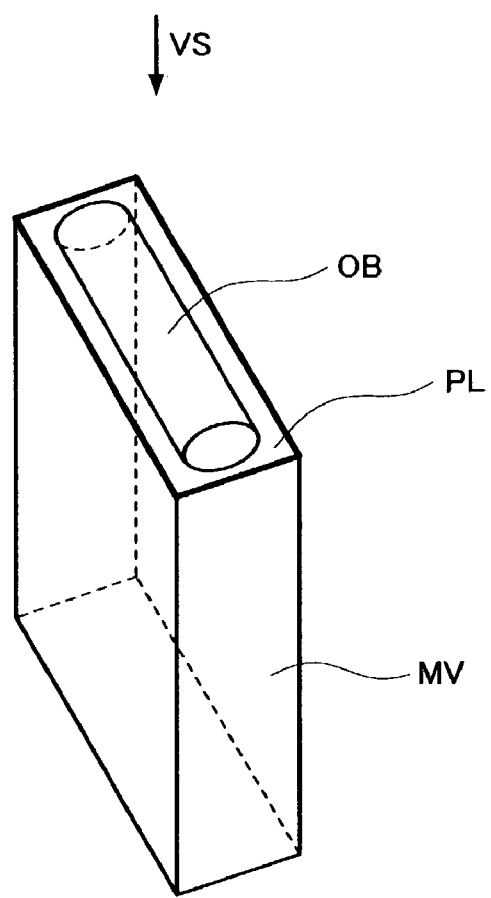
FIGS. 2A and 2B illustrate first and second techniques of generating a modifier volume.

For example, the first technique shown in FIG. 2A is designed to determine a polygon PL (which is, in a broad sense, a primitive face as in the remaining part of this specification) enclosing an image (two-dimensional image) which is provided by projecting a three-dimensional object OB (or a closed surface model) onto a projection plane orthogonal to a projection vector VS. A modifier volume MV is generated by elongating the vertexes of this polygon PL in the direction of projection vector VS. generated by the modifier volume MV.

Figure 2B:
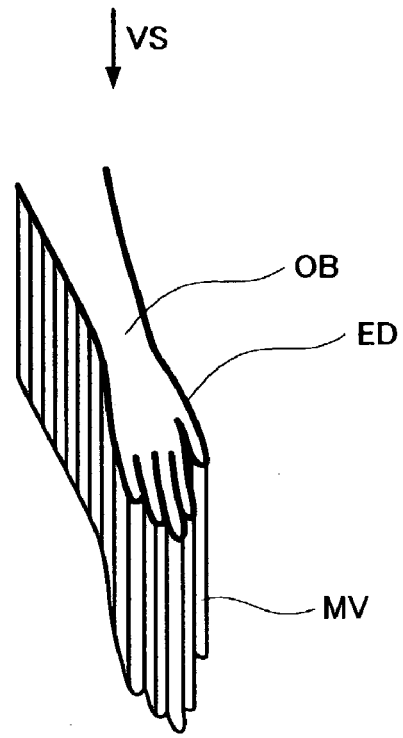

The second technique of FIG. 2B has also a disadvantage in that a process of judging the front or back of the polygon or detecting the edge ED becomes heavier. For such a reason, it becomes difficult to meet a request of real-time processing for completing all the processings within one frame.

To overcome such problems, this embodiment generates (or sets in a broad sense as in the remaining part of this specification) a modifier volume through a technique which will be described later.

Figure 3:
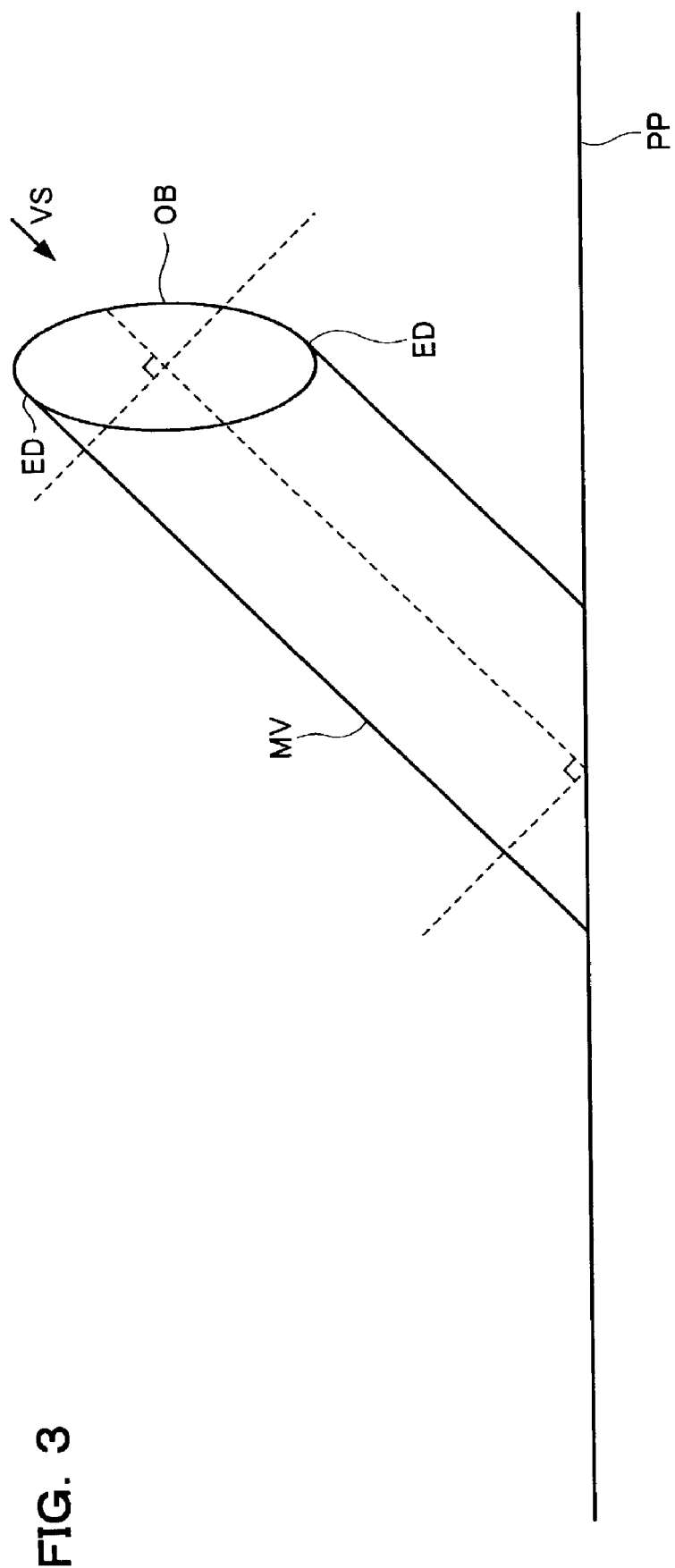
FIG. 3 illustrates the second technique of generating the modifier volume.

For example, the technique shown in FIG. 2B is designed to generate the modifier volume MV by determining the edge ED of the three-dimensional object OB and elongating that edge ED in the direction of projection vector VS, as shown in FIG. 3.

Figure 4:
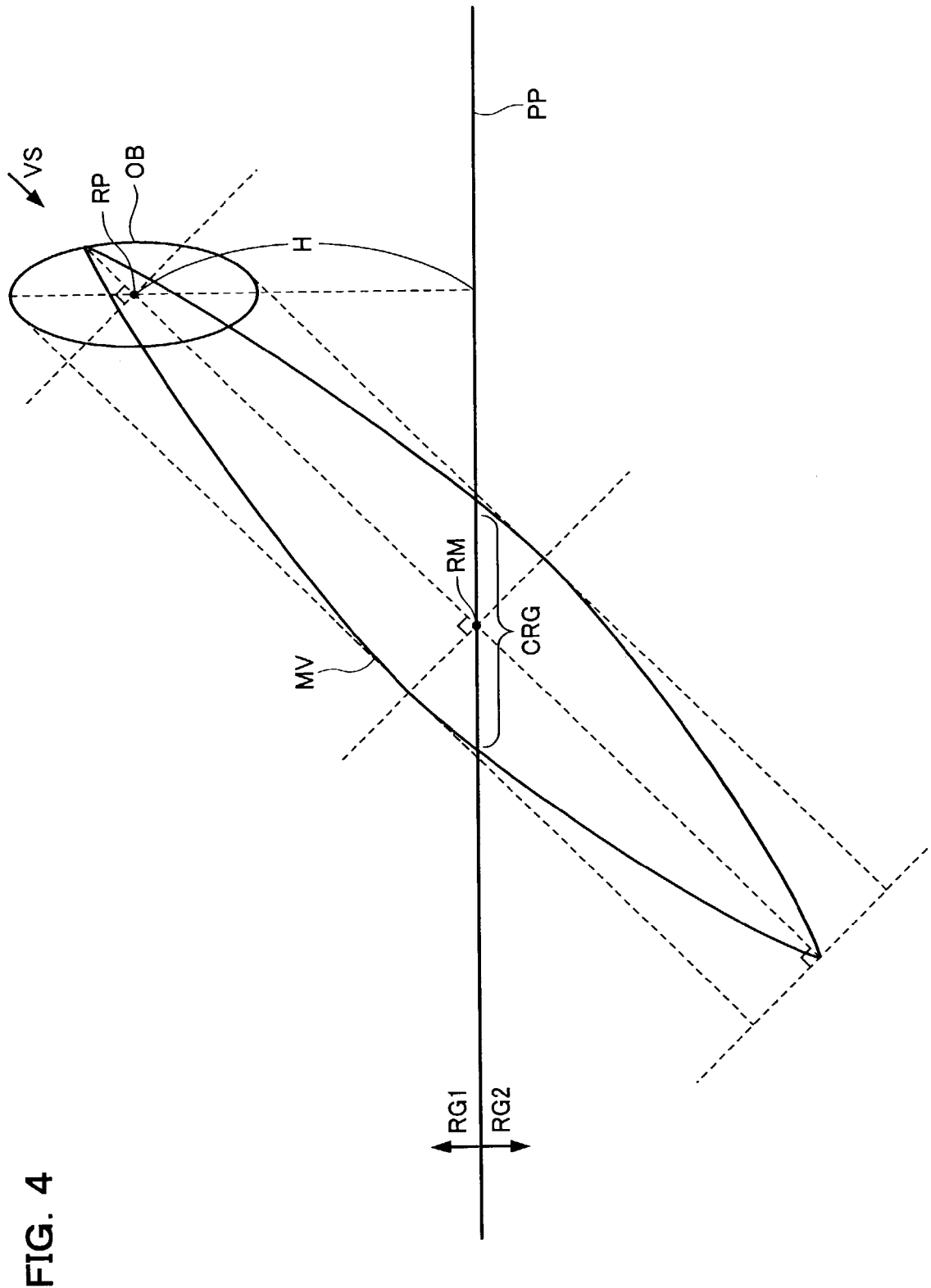
FIG. 4 illustrates a technique of generating the modifier volume according to the embodiment.

On the contrary, this embodiment generates a modifier volume MV (or a modifier volume object) by deforming a three-dimensionally shaped object OB itself in the direction of projection vector VS (which is, in a broad sense, the first vector as in the remaining part of this specification, as shown in FIG. 4.

More particularly, each vertex (or composing point) in the object OB is moved through a different moving distance in the direction of projection vector VS. This movement of vertex deforms the object OB, the deformed object OB being then set as a modifier volume MV.

FIG. 4 and subsequent figures are plan views of the object OB and modifier volume MV for convenience. However, these object OB and modifier volume MV are actually three-dimensional closed surface models each of which is an object defined by a plurality of vertexes (or an object composed by a plurality of primitive faces).

Figure 5:
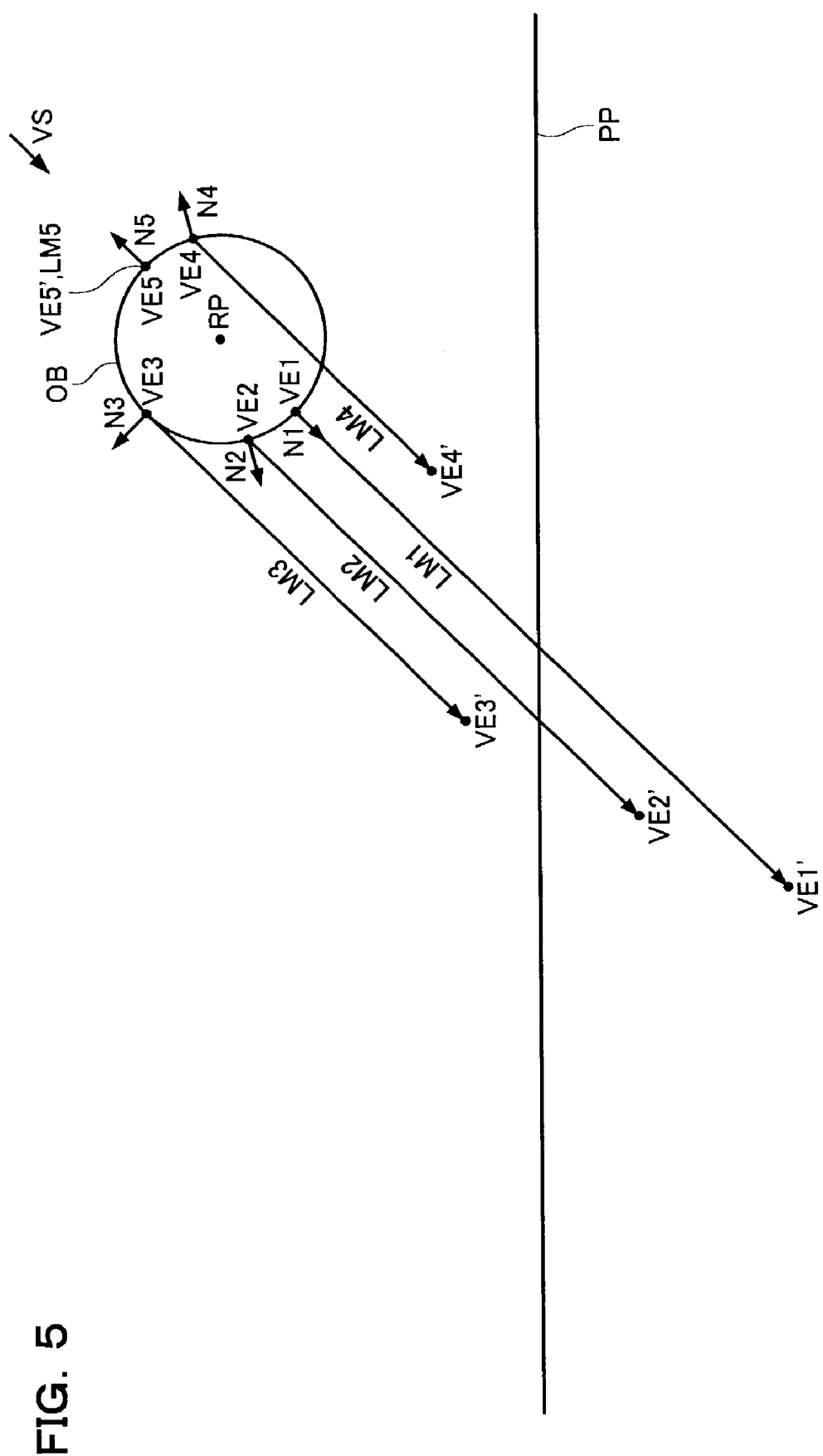
FIG. 5 illustrates a technique of changing a moving distance of a vertex according to an angle included between a projection vector and a normal vector.

In this embodiment, the vertexes VE1–VE5 of the object OB are moved, for example, to VE1'–VE5' as shown in FIG. 5 (VE5 and VE5' being the same position).

More particularly, each of the vertexes VE1–VE5 which has a smaller angle which may include a parameter mathematically equivalent to the angle) included between the projection vector VS and the corresponding normal vector N1, N2, N3, N4 or N5 (or a vector representing the orientation of primitive faces forming the object) is moved such that the moving distance LM1, LM2, LM3, LM4 or LM 5 thereof will be increased.

For example, in FIG. 5, an angle included between the projection vector VS and the normal vector N1 is zero degree, that is, minimum. On the other hand, an angle included between VS and N5 is 180 degrees, that is, maximum. In this case, therefore, the moving distance LM1 from VE1 to VE1' becomes maximum while the moving distance LM5 from VE5 to VE5' becomes minimum.

Similarly, the vertexes VE1–VE5 are moved such that the relationship of LM1>LM2>LM3>LM4>M5 can be established where LM2–LM4 are moving distances from VE2–VE4 to VE2'–VE4', respectively.

If the vertexes are moved by such a technique, the object OB can be elongated in the direction of projection vector VS, as shown in FIG. 4. Thus, the modifier volume MV can be generated to be optimum for the shadow generation in the object OB.

This embodiment increases the vertex moving distance as the distance (which is, a narrow sense, a height) between the representative point (or vertex) of an object and the projection plane (which is, in a broad sense, the first plane as in the remaining part of this specification).

Figure 6:
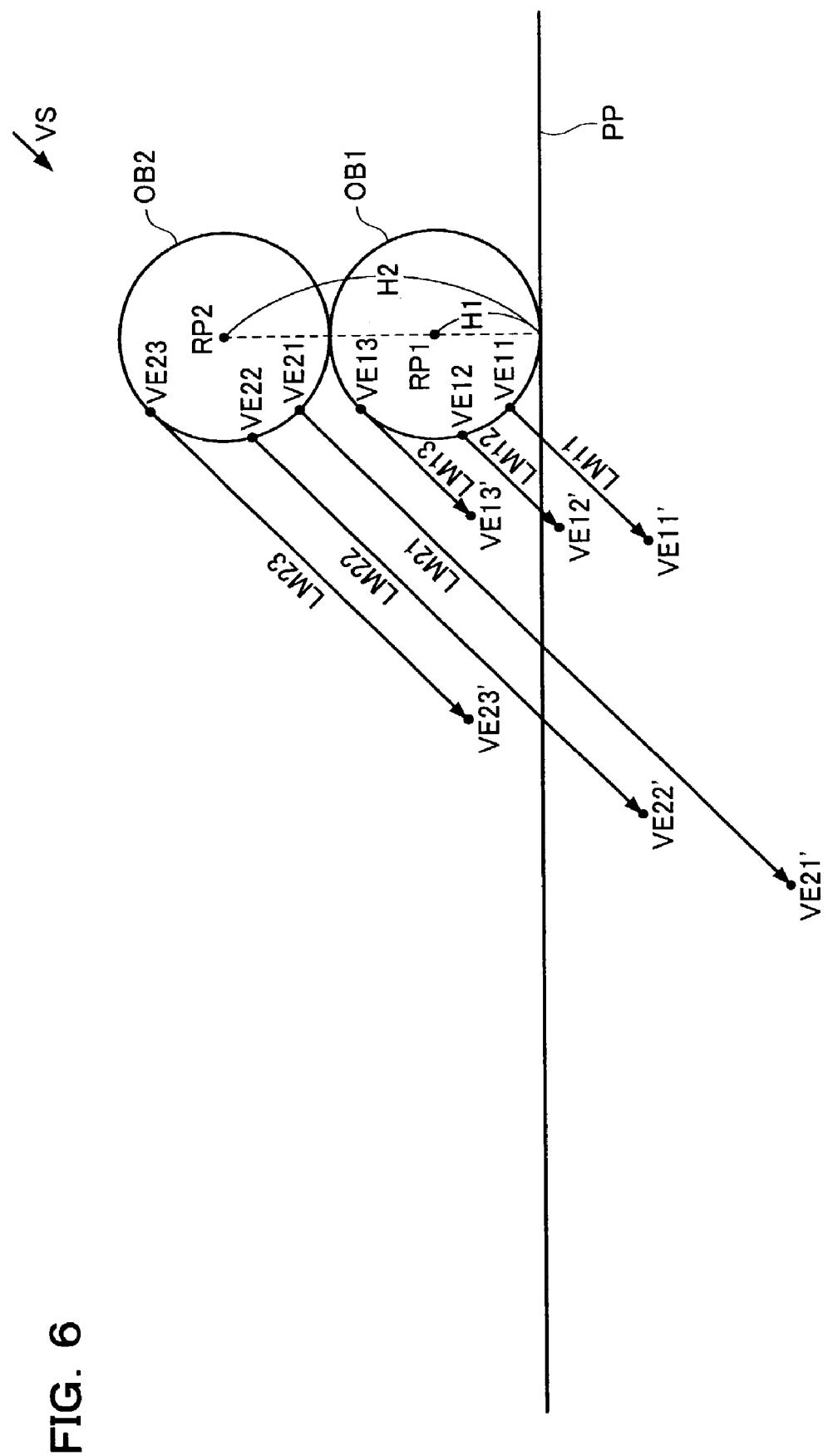
FIG. 6 illustrates a technique of changing the moving distance of the vertex according to a distance to a projection plane.

More particularly, FIG. 6 shows distances H1 and H2 between the representative points RP1 and RP2 of objects OB1 and OB2 and the projection plane PP, H2 being longer than H1. In this case, the moving distances LM21–LM23 of vertexes VE21–VE23 in the object OB2 to VE21'–VE23' are respectively longer than the moving distances LM11–LM13 of vertexes VE11–VE13 in the object OB1 to VE11'–VE13', as shown in FIG. 6.

Thus, the modifier volume MV can always intersect the projection plane PP without depending upon the distance H from the object OB (or its representative point RP) to the projection plane PP, as shown in FIG. 4. In other words, the modifier volume MV can be arranged such that one end (e.g., right end) of the modifier volume MV is placed in the first one of regions RG1 and RG2 (or first and second regions) partitioned by the projection plane PP, on which the object OB is arranged, while the other end (e.g., left end) of the modifier volume MV being placed in the other region RG2.

If the modifier volume MV always intersects the projection plane PP without depending upon the distance H from the object OB to the projection plane PP, the intersecting region CRG can always be ensured without dependent on the distance H, as shown in FIG. 4. Even if the distance H varies on the movement of the object OB, therefore, the brightness reduction for generating a shadow (which is, in a broad sense, an attribute changing process as in the remaining part of this specification) can adequately be applied to this ensured intersection region CRG.

FIG. 4 shows the modifier volume MV arranged (or set) so that the representative point RM (or substantially the central point) of the modifier volume MV is located on the projection plane PP.

Thus, the area of the intersecting region CRG can be maximized since the widest part of the modifier volume MV intersects the projection plane PP. Therefore, any undesirable situation in which the shadow of the object OB is decreased in width or in which a gap will be created between the shadows of the part objects can be avoided.

FIG. 6 shows the vertex moving distances LM11–LM13 and LM21–LM23 varied depending on the distances H1, H2 between the representative points RP1, RP2 of the objects OB1, OB2 and the projection plane PP, respectively. However, the vertex moving distance may be changed depending on the distance between the vertex of each of the objects OB1, OB2 and the projection plane PP.

As described above, this embodiment can automatically generate the modifier volume MV only by moving the vertexes without need of any process of generating the polygon PL enclosing the shadow image, unlike the first technique of FIG. 2A. Therefore, the process of generating the modifier volume MV can be simplified. Additionally, the flickering in the shadow can be avoided since any singular point will not be created even if the relative positional relationship between the projection vector VS and the object OB varies one from another, unlike the first technique of FIG. 2A.

Although the second technique of FIGS. 2B and 3 has to detect the edge ED of the object OB, this embodiment does not require such a detection of edge ED. Therefore, the processing load can be largely reduced.

2.2 Concrete Example of Vertex Movement

This embodiment moves the vertexes through a technique concretely described in the following.

It is now assumed, for example, that the coordinates of each vertex (VE1–VE5) of an object OB before moved are P (PX, PY, PZ) and that the coordinates of each moved vertex are Q (QX, QY, QZ) and that a projection vector is VS (VSX, VSY, VSZ). It is also assumed that the inner product between the projection vector VS and a normal vector (N1–N5) at each vertex of the object OB is IP and that a coefficient multiplied by IP is K and that a distance parameter between the object OB (its representative point or vertex) and the projection plane PP is H.

In this case, this embodiment moves the vertexes of the object so that $$Q = P + H \times (K \times IP + 1) \times VS \qquad (3)$$

is satisfied.

According to the above expression (3), the moving distance between P and Q increases as the inner product IP between the projection vector VS and the normal vector increases. Therefore, a vertex having a smaller angle between the projection vector VS and the normal vector can have its increased moving distance, as shown in FIG. 6.

Figure 7:
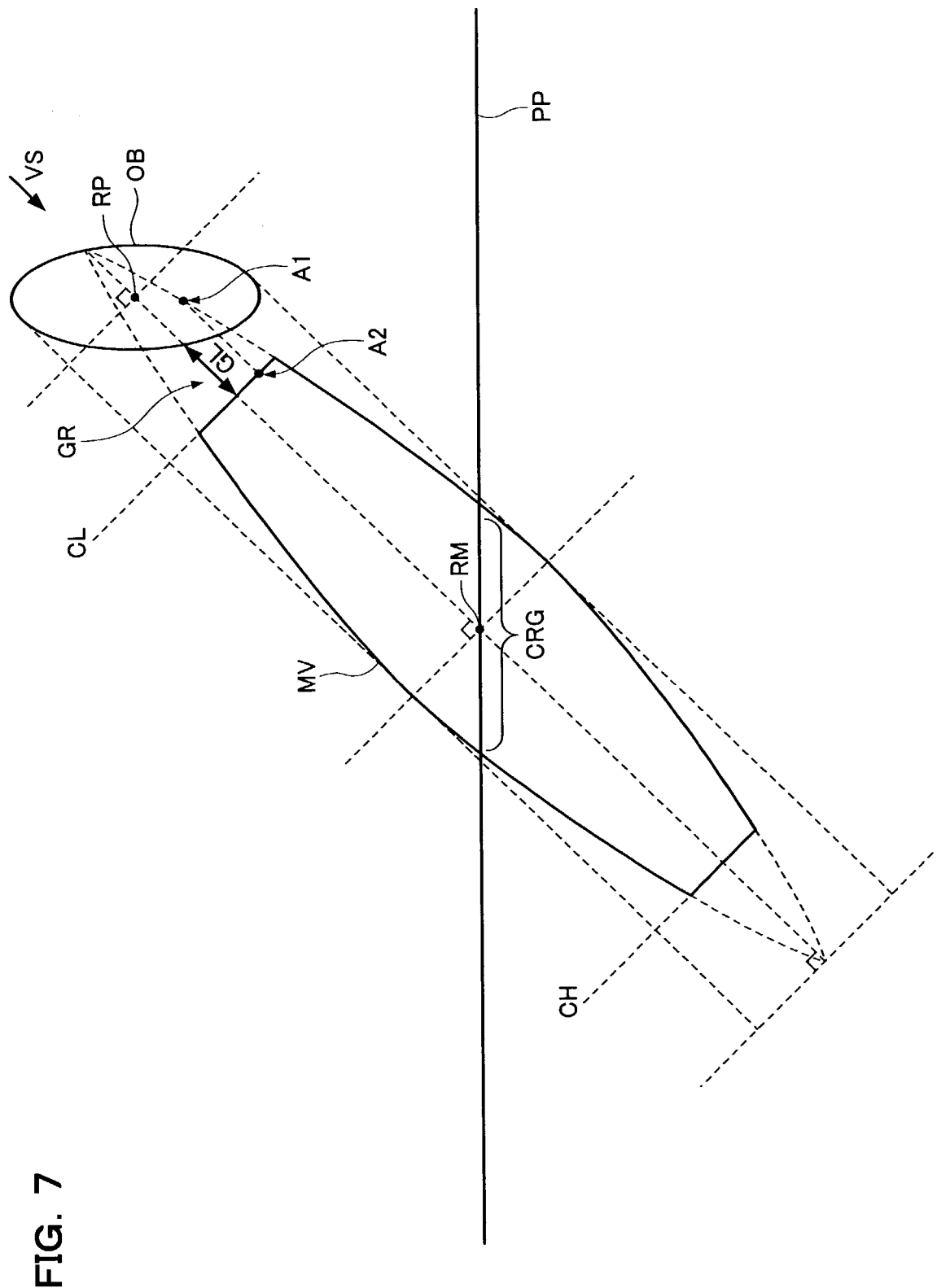
FIG. 7 illustrates a technique of providing a gap region between an object and the modifier volume.

Additionally, according to the above expression (3), the moving distance between P and Q increases as the distance parameter H increases. Therefore, the vertex moving distance in the object can increase as the distance between the object (its representative point or vertex) and the projection plane increases, as shown in FIG. 7.

In such a manner, the object can be deformed to generate its modifier volume through a simplified procedure with its reduced load, according to the above expression (3).

The inner product IP in this embodiment may include a parameter mathematically equivalent to the inner product (e.g., Z component in a coordinate system in which the direction VS corresponds to Z-axis).

Additionally, the coefficient K in the above expression (3) can be K≧1 and more desirably K>1 (e.g., K=2).

Furthermore, the vertexes of the object may be moved so that:

$$Q=P+H\times F(IP)\times VS \qquad (4),$$

instead of the above expression (3).

In this expression (3), F(IP) is a given function having an argument IP (e.g., a function of executing the linear or non-linear transformation of the argument).

2.3 Formation of Gap Region

In this embodiment, a gap region GR is provided between the object OB and the modifier volume MV, as shown in FIG. 7. That is to say, the object OB and modifier volume MV will not overlap each other.

Thus, it can be avoided that the shadow of the object OB (which is referred to as a self-shadow hereinafter) falls on itself.

That is to say, the brightness reduction for generating a shadow will be carried out against a shadow space specified by the modifier volume MV (which is, in a broad sense, a space as in the remaining part of this specification). Thus, a shadow of the object OB is generated, for example, at such an intersection region CRG as shown in FIG. 7.

However, if the object OB and modifier volume MV overlap one on another, the brightness reduction will also be carried out against the overlap region. As a result, the self-shadow will be generated at the overlap region.

This embodiment prevents the creation of self-shadow by forming a gap region GR between the object OB and the modifier volume MV (or by releasing MV from OB), as shown in FIG. 7.

More particularly, the value of the inner product IP is clamped within a given range so that, in an expression of $$Q=P+H\times(K\times IP+1)\times VS \qquad (5)$$

(this expression is the same as the above expression (3)), $$CL\leq K\times IP+1\leq CH \qquad (6)$$

is satisfied. Thus, the modifier volume MV is set to such a shape as shown in FIG. 7 to form the gap region GR between MV and OB. That is to say, the gap region GR will be formed since the vertex moved to a position A1 in FIG. 7 according to the above expression (5) is moved to another position A2 by clamping the inner product IP according to the above expression (6).

To form the gap region GR, the clamping at the lower limit value CL is necessary, but the clamping at the upper limit value CH is not necessarily required.

The technique of forming the gap region GR is not limited to the technique of clamping the value of the inner product IP. For example, the modifier volume MV may be moved by a given distance in the direction of projection vector VS (or a direction extending from OB to MV). Alternatively, a procedure of deforming (scaling or reducing) the modifier volume MV formed as shown in FIG. 4 in a direction along the projection vector VS may be applied. That is to say, the deformation maybe carried out to move the vertexes of the modifier volume MV in a direction toward the representative point RM (or central point).

2.4 Change of Gap Length Depending on Distance

In this embodiment, the gap length of the gap region GR is changed depending on the distance between the object (representative point, vertex or a point specified by the vertex) and the projection plane.

Figure 8:
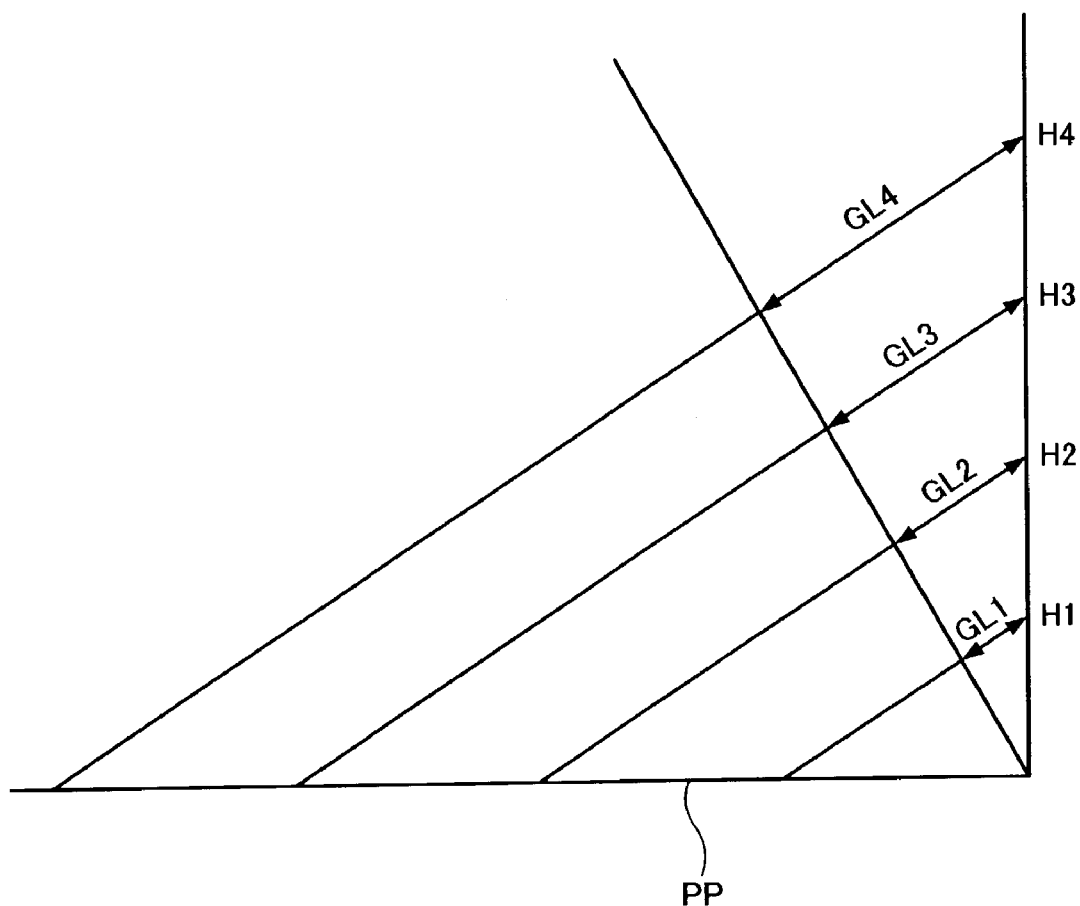
FIG. 8 illustrates a technique of changing a gap length of the gap region according to a distance between an object and a projection plane.
Figure 9:
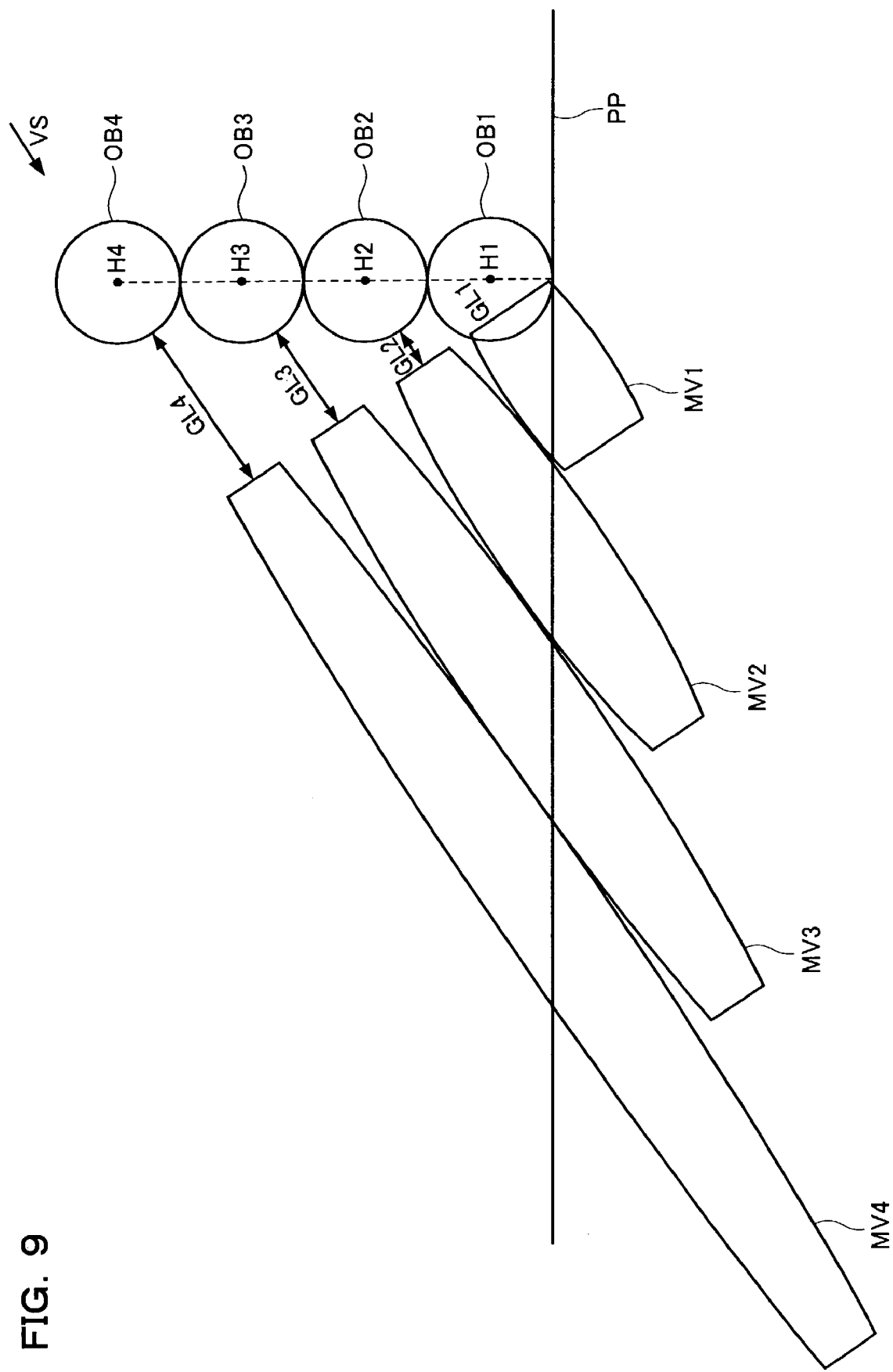
FIG. 9 illustrates a technique of changing the gap length of the gap region according to the distance to the projection plane.

More particularly, each of the gap lengths GL1–GL4 in the gap regions is increased as the distance H1–H4 between the corresponding one of objects OB1–OB4 and the projection plane PP increases, as shown in FIGS. 8 and 9.

For example, FIG. 9 shows modifier volumes MV2, MV3, MV4 generated respectively corresponding to the objects OB2, OB3 and OB4. In addition, the distances H2, H3 and H4 between the respective objects OB2, OB3 and OB4 and the projection plane PP are placed in a relation of H2<H3<H4.

In this case, the gap lengths of the gap regions formed between the respective objects OB2, OB3 and OB4 and the respective modifier volumes MV2, MV3 and MV4 are set to be GL2<GL3<GL4.

However, the object OB1 riding on the projection plane PP does not have a gap region, for example, with the gap length GL1 thereof being a negative value. Therefore, a self-shadow may be generated on the object OB1, but there is not a great problem since this self-shadow is integrated and displayed with a shadow generated on the projection plane PP.

More particularly, the process of increasing the gap length depending on the object and the projection plane can be realized as described below.

That is to say, in the same expressions as the above expressions (5) and (6):

$$Q=P+H\times(K\times IP+1)\times VS \qquad (7)$$

$$CL\leq K\times IP+1\leq CH \qquad (8)$$

the lower limit value CL of a clamp range is changed depending on the distance H (the upper limit value CH may also be changed). It is thus possible to change the gap lengths GL1–GL4 depending on the distances H1–H4, respectively, as shown in FIG. 9.

For example, with a character appearing for a game (which is, in a broad sense, a model object as in the remaining part of the specification), part objects located apart from the ground (or the projection plane) have their increased degrees of freedom on movement. Therefore, it frequently happens, for example, that the distance between the right and left hands of the character is abnormally reduced or that the distance between the right hand and body is abnormally shortened.

If the distance between the right and left hands of the character is abnormally reduced, for example, the self-shadow The second technique shown in FIG. 2B is designed to generate the modifier volume MV by determining the edge ED of a three-dimensional object OB visible from the projection vector VS (or light source) and elongating that edge ED in the direction of projection vector VS.

More particularly, it is first judged whether the polygon forming the object OB is oriented frontward or backward as viewed from the projection vector VS. This can be determined by examining the polarity of Z component in the normal vector of the polygon in a coordinate system in which the Z-axis direction corresponds to the direction of projection vector VS (or light-source coordinate system). One then finds an edge ED which is shared by two polygons, one being frontward oriented and the other being backward oriented, among the edges of the polygons forming the object. The found edge ED is then elongated in the direction of projection vector to generate a modifier volume MV.

However, the first technique of FIG. 2A must determine a polygon PL which always encloses the projected image of the object OB irrespectively of the direction of projection vector VS. Therefore, the algorithm of determining such a polygon PL is complicated, thereby leading to prolongation of the product development time period. In addition, there may be created a singular point at which the shape of the polygon PL is frequently changed merely by the relative positional relationship between the projection vector VS and the object OB being delicately varied. For such a reason, flickering may occur in a shadow for the right hand may fall on the left hand. If the distance between the right hand and body is abnormally shortened, the self-shadow for the right hand may fall on the body of the character. If several self-shadows fall on the character itself in such a manner, the character may be generated to be an unnatural image. In particular, the self-shadows falling on the same character at close locations may have their uneven sizes and provide an unnatural connection between the self-shadows. This will further degrade the quality of the generated image.

In this embodiment, for example, the object OB4 corresponding to one hand of the character may have its increased gap length GL4, as shown in FIG. 9. Therefore, it can be prevented that the self-shadow of this object OB4 corresponding to the character's hand falls, for example, on the object OB3 corresponding to the character's body. Therefore, a more natural image can be generated with an improved quality.

Additionally, even if the gap length GL4 on the object OB4 is increased as shown in FIG. 9, it difficult to occur that the shadow of the object OB4 will not fall on the projection plane PP, since the distance H4 between the object OB4 and the projection plane PP is increased. For example, if the projection plane PP is in the form of a wall, the shadow of the object OB4 may fall on the wall.

The gap length of the object may be changed linearly or non-linearly against the height thereof. Additionally, the gap length may be made constant if the object reaches a given height.

2.5 Change of Modifier Volume Width

Figure 10:
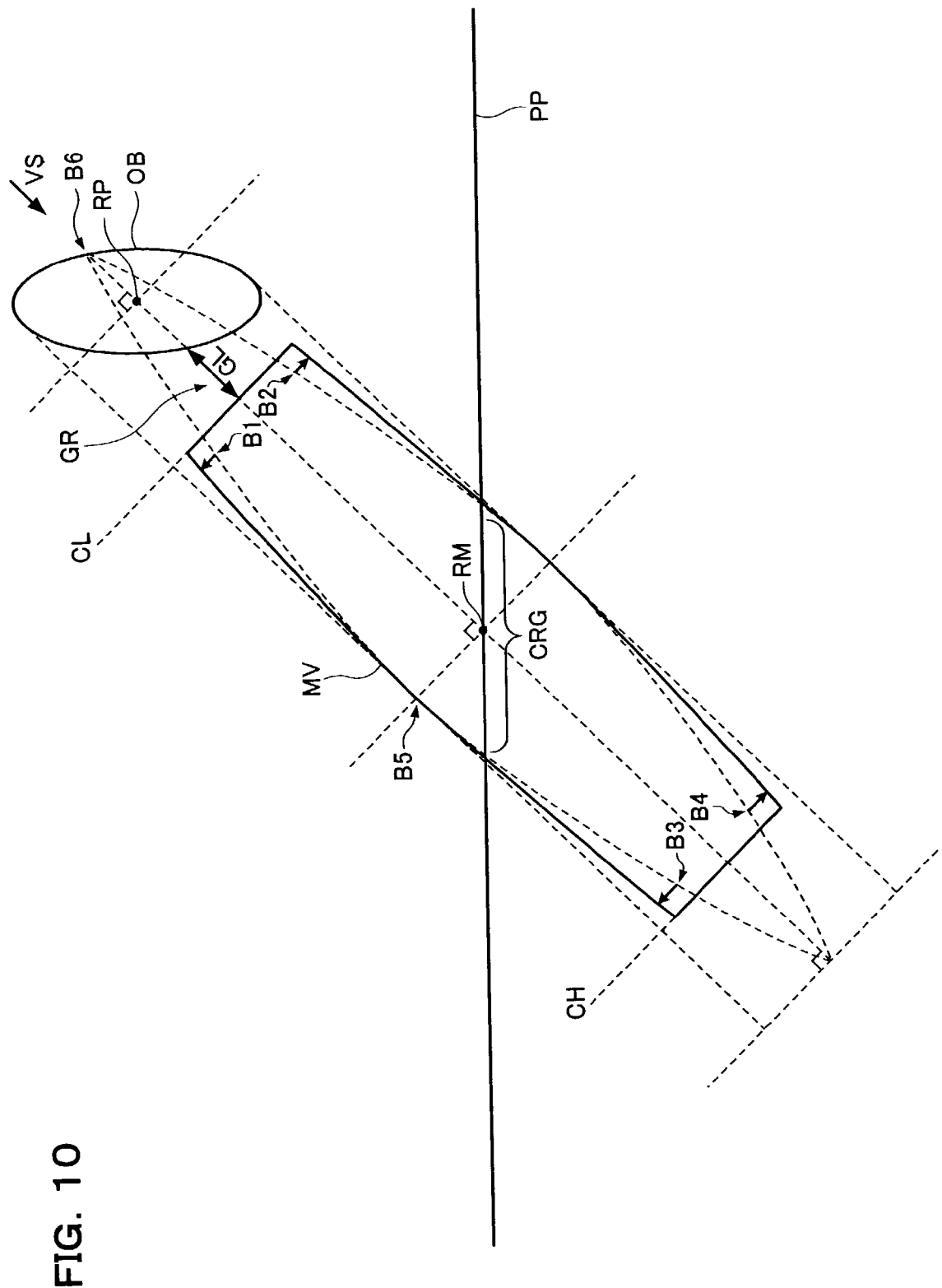
FIG. 10 illustrates a technique of increasing the width of the modifier volume.

This embodiment performs a process of changing the width of such a modifier volume as shown in FIG. 7 and other figures (which width is measured in the direction orthogonal to the projection vector VS). More particularly, the width of the modifier volume MV is increased in the direction orthogonal to the projection vector VS, as shown by B1–B4 in FIG. 10.

It is thus possible to increase the area of the intersection region CRG in which the brightness reduction process (or attribute changing process) is carried out. As a result, the quality of the shadow image generated in the intersection region CRG can further be improved. Additionally, the connection between the shadows of the part objects can be made more natural.

More particularly, in this embodiment, K>1 in $$Q=P+H\times(K\times IP+1)\times VS \qquad (9)$$

which is the same expression: as the above expression (7).

For example, if K=2 is set, the length of the modifier volume MV in the direction of projection vector VS maybe doubled. The modifier volume MV has its maximum width at a position shown by B5 in FIG. 10 and its minimum width at a position shown by B6. Therefore, if the length of the modifier volume MV (along the major axis) is increased, the widths of the modifier volume MV (along the minor axis) can be increased at positions shown by B1–B4.

Even if the K is increased to provide K>1 in such a manner, the inner product IP may be clamped within a given range as described. Even if K is increased, therefore, the length of the gap length GL will not be reduced. Thus, the gap region GR can be ensured between the object OB and the modifier volume MV.

The technique of increasing the width of the modifier volume MV is not limited to such a technique as set K>1 in the above expression (9). For example, the width of the modifier volume MV may be increased by scaling (reducing) the modifier volume MV in the direction perpendicular to the projection vector VS.

Figure 11:
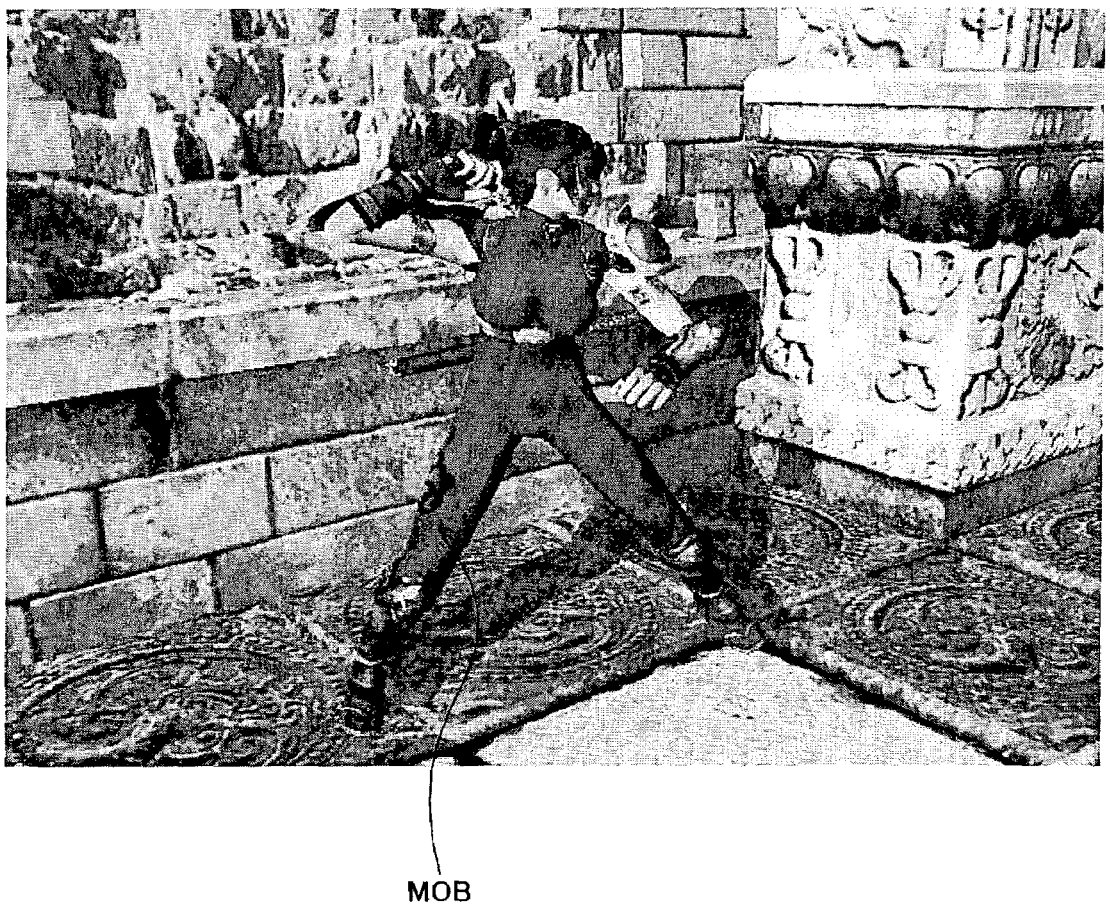
FIG. 11 shows an example of game image generated according to the embodiment.

FIG. 11 shows a game image generated by this embodiment. As shown in FIG. 11, this embodiment can properly cause a realistic shadow of a model object (or character) MOB to fall on the ground or a wall.

Figure 12:
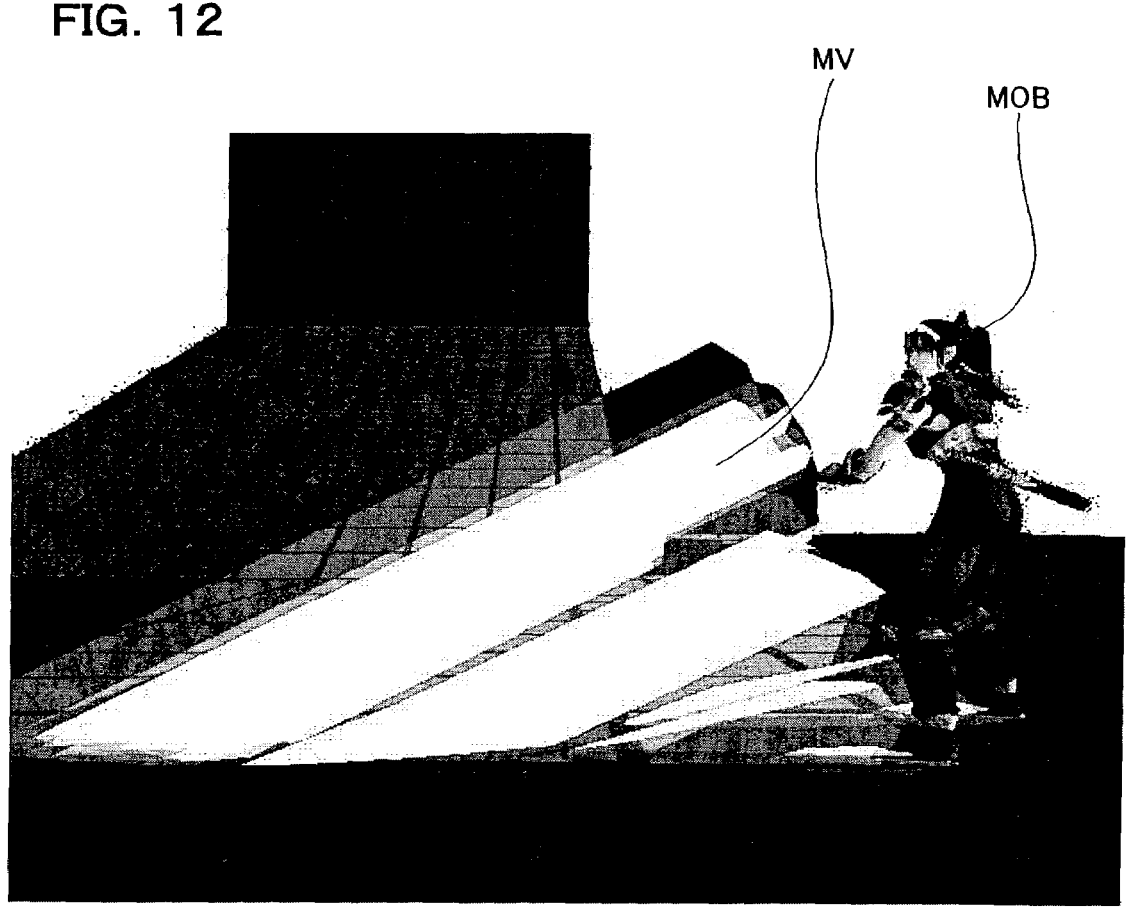
FIG. 12 shows an example of the modifier volume generated according to the embodiment.
Figure 13:
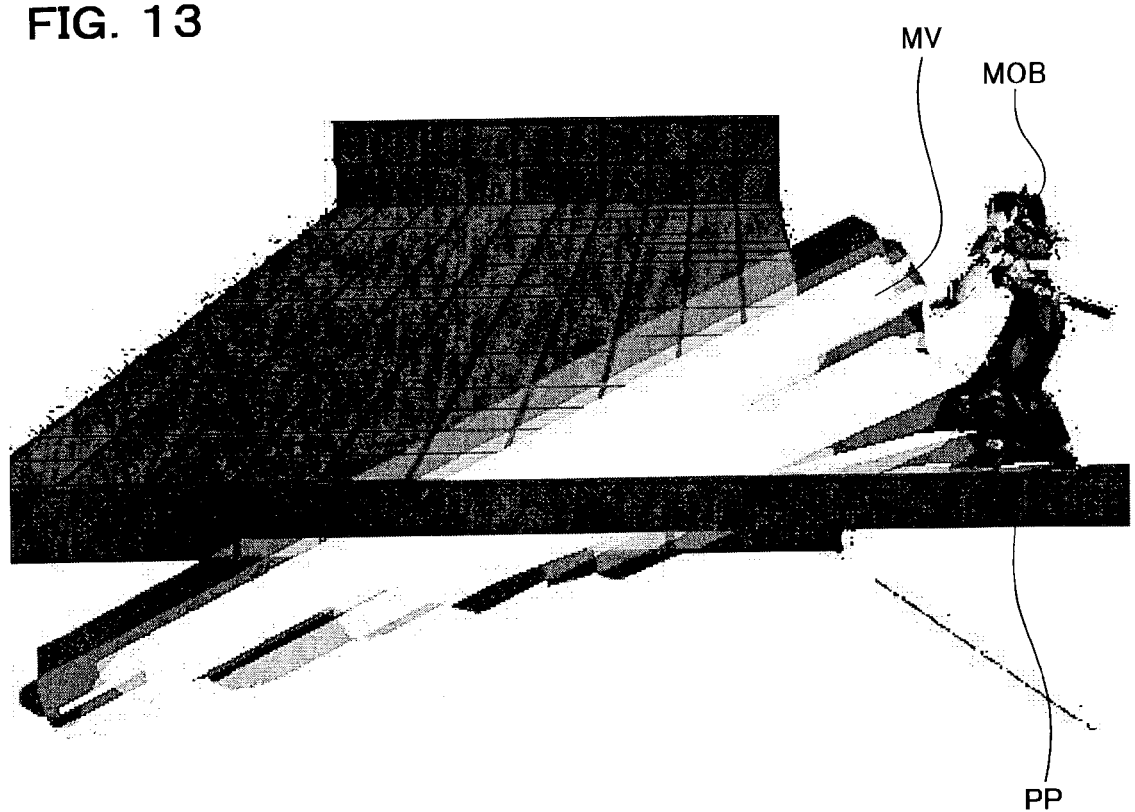
FIG. 13 shows an example of the modifier volume generated according to the embodiment.

FIGS. 12 and 13 show a modifier volume generated for the model object MOB. As described in connection with FIG. 9, this embodiment changes the gap length between each of part objects (head, hands, body, waist, feet or the like) forming the model object MOB and the modifier volume MV depending on the height of that part object such that a part object located at a higher position will have its longer gap length. As shown in FIG. 13, furthermore, this embodiment sets the modifier volume MV such that it intersects the projection plane (or ground) PP (or gets under the projection plane PP).

2.6 Use of Bounding Volume

Figure 14A:
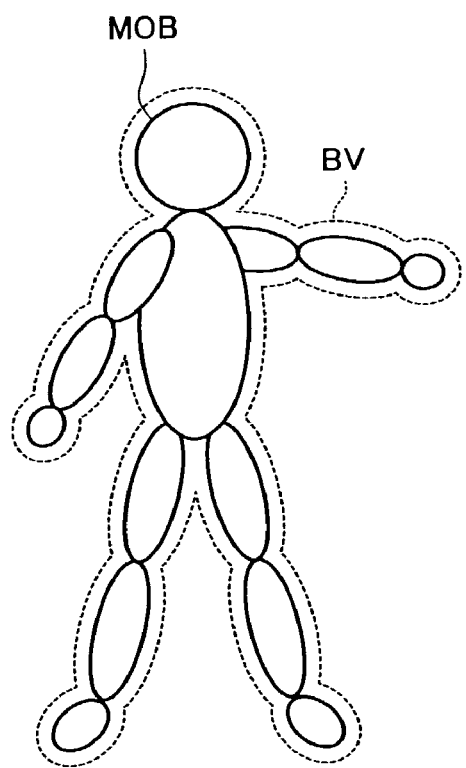
FIGS. 14A, 14B and 14C illustrate a bounding volume.

This embodiment provides a bounding volume BV which encloses the model object MOB or each of the part objects forming the model object MOB, as shown in FIG. 14A. This bounding volume BV is also a three-dimensional closed surface model which is configured by a plurality of vertexes (or primitive faces).

Figure 14B:
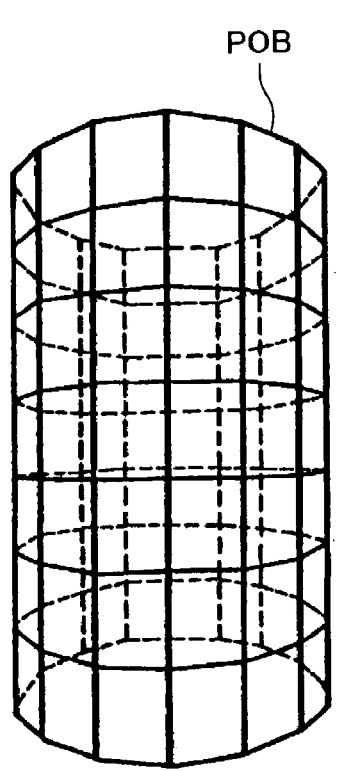
Figure 14C:
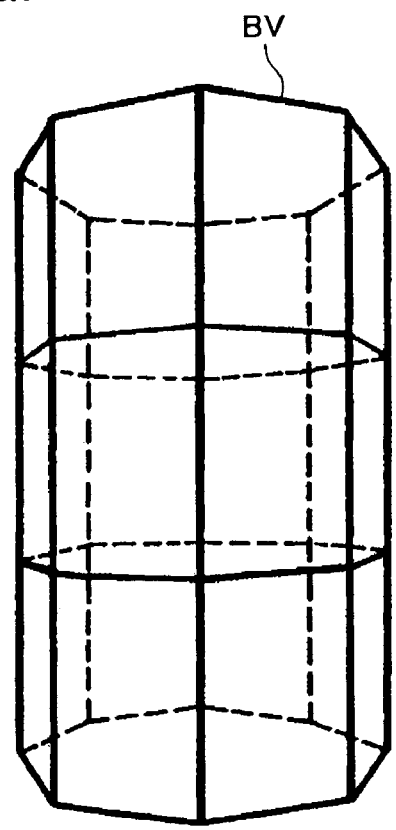

For example, if a part object POB in the model object MOB is as shown in FIG. 14B, a bounding volume BV corresponding to that part object POB as shown in FIG. 14C is provided in a storage section. This bounding volume (or simple object) BV is an object having its shape that is similar to the part object POB.

Figure 15:
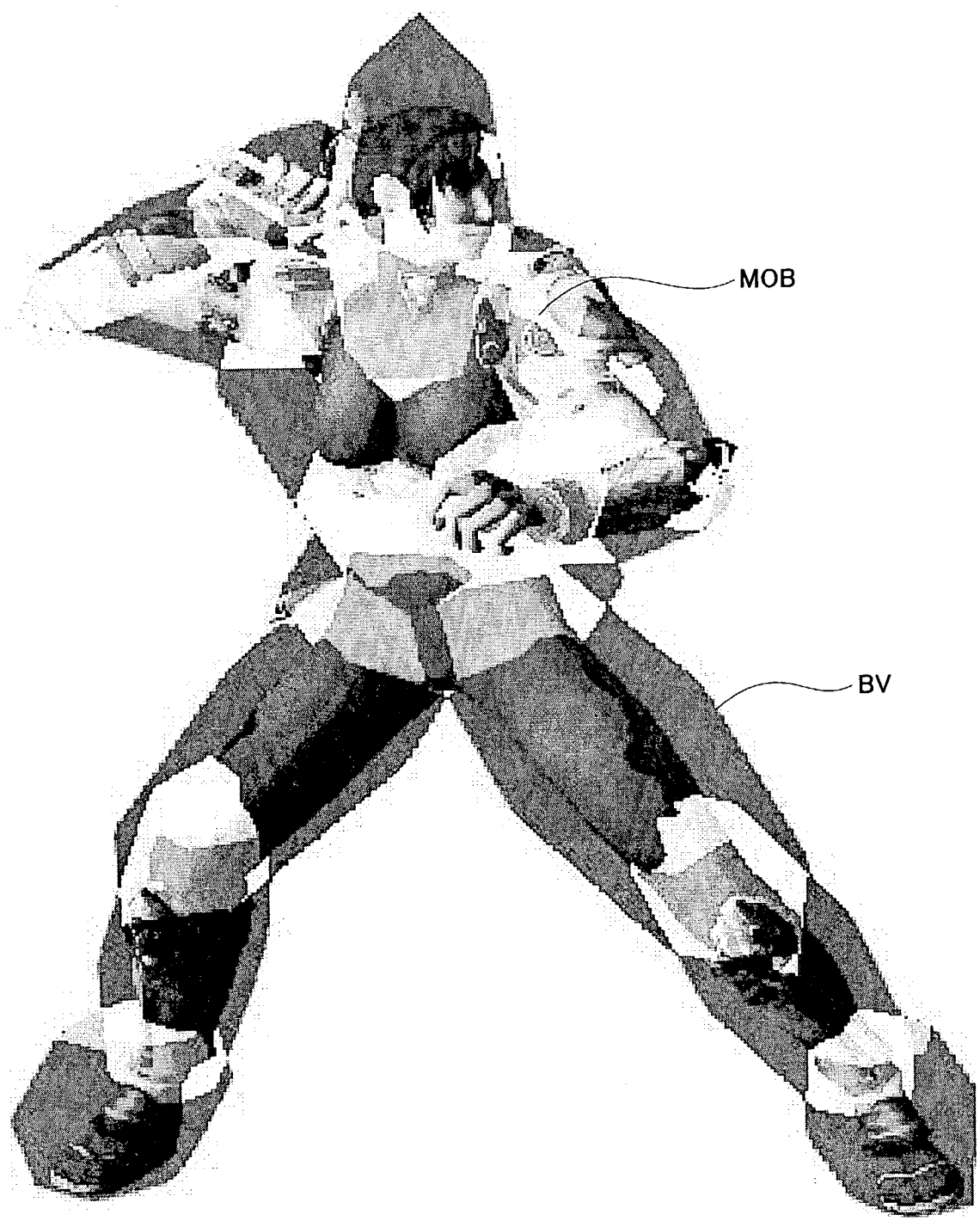
FIG. 15 illustrates the bounding volume.

FIG. 15 shows a bounding volume BV employed in this embodiment. In such a manner, the bounding volume BV becomes an object having its shape which encloses the model object MOB or each of its part objects.

In this embodiment, the modifier volume MV is deformed to generate the bounding volume BV through such a technique as described in connection with FIG. 4 and other figures. Thus, the number of vertexes to be processed on movement can be reduced to alleviate the processing load.

The bounding volume BV to be processed on vertex movement is preferably an object having its uniform vertex density. For example, the most desirable bounding volume BV is in the form of a spherical object (including a regular ball or oval ball).

In case of the spherical object, the number of vertexes as viewed from the projection vector becomes uniform in any direction of projection vector. Therefore, the vertexes in the spherical object can appropriately be moved in any direction of projection vector. That is to say, if the spherical object is deformed in the direction of projection vector, the modifier volume can always be provided with an appropriate shape without depending upon the direction of projection vector.

The regular-ball-shaped object (which is an object having the same radius in the major and minor axes) may be enlarged or decreased in the direction of a given axis (major or minor axis) to determine an oval-ball-shaped object (which is an object having different radiuses in the major and minor axes) having a different shape, the determined oval object being then set as a bounding volume for each of the part objects in the model object.

For example, the first to N-th oval-ball-shaped objects may be obtained by enlarging (or reducing) the regular-ball-shaped object with the first to N-th enlargement ratios (or reduction ratios) in the direction of given axis. These first to N-th oval-ball-shaped objects are used as the bounding volumes of the first to N-th part objects forming the model object, respectively.

At this time, the normal vector of each vertex in the regular-ball-shaped object as an origin to be deformed may be set, for example, at the normal vector of the corresponding vertex in the bounding volume. In this case, the orientations of the vertex normal vectors set in the bounding volume (which is, a broad sense, an object) will not accurately coincide with the orientation of the surface, but it will not raise very problem.

Figure 16A:
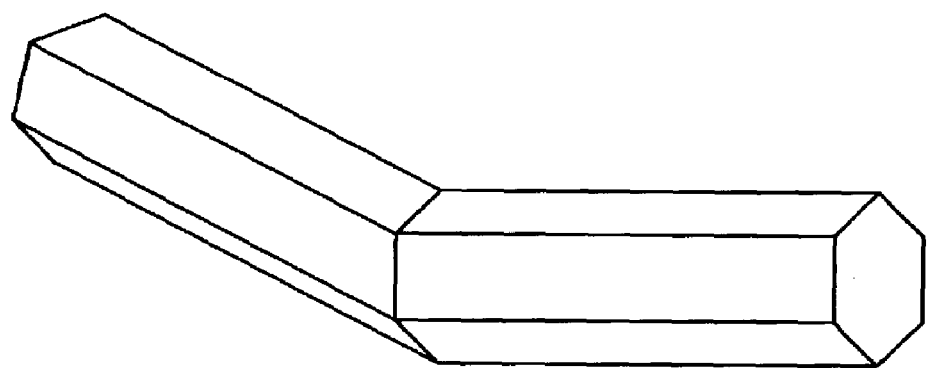
FIGS. 16A and 16B illustrate a technique of equalizing a vertex density in the bounding volume.

There may be a case where one arm in the model object has its uneven vertex density, as shown in FIG. 16A. That is to say, there are many cases that the number of vertexes is reduced in a rectilinear configuration for saving the number of polygons.

Figure 16B:
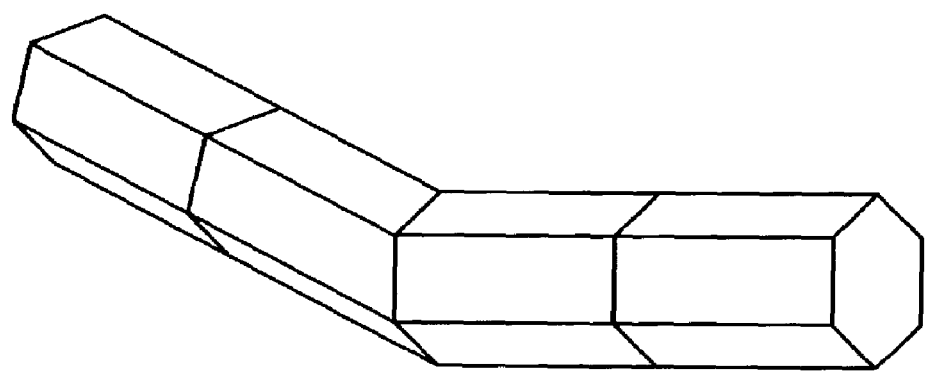

In such a case, this embodiment makes the vertex density of the bounding volume to be more uniform than that of the model object or its part object of FIG. 16A, as shown in FIG. 16B. Thus, the vertexes of the bounding volume can properly be moved in any direction of projection vector to provide a properly shaped modifier volume.

The object to be processed on vertex movement according to this embodiment may a bounding volume enclosing one part object or the entire model object.

Furthermore, a modifier volume may be generated by moving a model object or its part object itself through the vertex moving technique according to this embodiment shown in FIG. 4 and other figures. Thus, the memory capacity can be saved since it is not necessary to provide any bounding volumes separately from the model object and part objects.

2.7 Order of Drawing

In this embodiment, the drawing process is carried out in such an order as shown in FIG. 17, for example.

Namely, a background is first drawn and a plurality of model objects MOB1, MOB2 are then drawn, as shown in FIG. 17. However, the drawing order relating the background and model objects MOB1, MOB2 may be inversed while the background and model objects MOB1, MOB2 may be drawn at the same time.

Thereafter, this embodiment draws a modifier volume to generate the shadows of the model objects MOB1 and MOB2.

Figure 18:
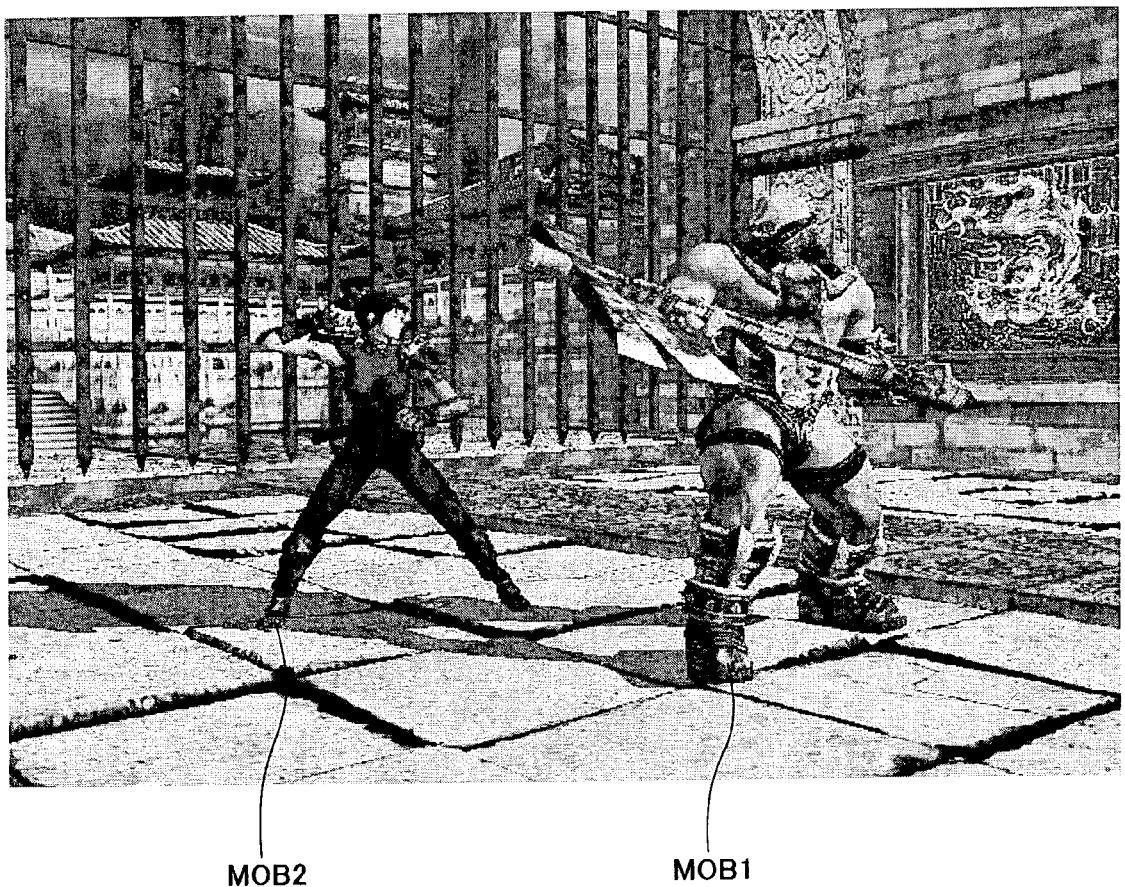
FIG. 18 shows an example of the game image generated according to the embodiment.

FIG. 18 shows a game image which is drawn in such an order.

As shown in FIG. 18, this embodiment can cause the shadow of the model object MOB1 to fall on the model object MOB2. Therefore, the shadow can be drawn more realistically.

A comparative example of drawing technique is shown in FIG. 19.

In this comparative example of drawing technique, a background is first drawn and a modifier volume is then drawn to generate the shadows of model objects MOB1 and MOB2. Thereafter, the model objects MOB1 and MOB2 are drawn.

In this comparative example of drawing technique, the shadows of these model objects MOB1 and MOB2 fall on the background, but they will not fall on the counterpart object.

Namely, in accordance with the drawing technique of this embodiment shown in FIG. 17, the shadow of the model object MOB1 falls on the counterpart model object MOB2 as shown in FIG. 18, but the comparative example of drawing technique shown in FIG. 19 will not cause the shadow of MOB1 to fall on MOB2. Therefore, the comparative example of drawing technique cannot enough improve the reality in the shadow, in comparison with the technique of this embodiment.

The prior art did not provide a gap region between the model object and the modifier volume, unlike this embodiment shown in FIG. 9. In the prior art, therefore, the self-shadow will fall on a model object if the drawing order of FIG. 17 is taken to draw a modifier volume after the model object has been drawn. For such a reason, the prior art could not but take such a drawing order as shown in FIG. 19 so that such a self-shadow would not been drawn. The drawing order of FIG. 19 can cause the shadow from the modifier volume to fall only on the background.

However, the drawing order of FIG. 19 will not cause the shadow of the model object MOB1 to fall on that model object itself as self-shadow, but also not to fall on the counterpart model object MOB2. Therefore, such an image as shown in FIG. 18 cannot be generated after all.

On the contrary, this embodiment forms the gap region between a model object and a modifier volume as shown in FIG. 9. Therefore, the drawing technique shown in FIG. 17 can be taken since there is a little possibility that the self-shadow falls. As a result, a game image generated is ideal in that the self-shadow of the model object MOB1 will fall on the counterpart model object MOB2, but not on the model object MOB1 itself.

3. Process of this Embodiment

The details of the process according to this embodiment will be described in connection with the flowcharts shown in FIGS. 20, 21, 22 and 23.

First of all, a projection vector and gap parameters RMIN, RMAX are determined (step S1).

A background and model object (or character) are then drawn to generate Z plane in the Z buffer (step S2, and see FIG. 17). At the same time, the values of all pixels in the stencil buffer are initialized to the maximum value (step S3).

Modifier volumes (vertexes) are then generated based on the projection vector, bone matrixes in a shadow space generating object (or closed surface model) and the vertex normal information of that object (step S4, and see FIG. 4).

A polygon facing forward as viewed from the viewpoint among the polygons forming the modifier volume is then drawn (step S5). At this time, the value of the stencil buffer is subtracted by one (or first value) relating to a pixel having Z value smaller than the Z value of the Z buffer (but the Z buffer is not updated).

Then, a polygon facing backward as viewed from the viewpoint among the polygons forming the modifier volume is drawn (step S6). At this time, the value of the stencil buffer is added by one relating to a pixel having Z value smaller than the Z value of the Z buffer (but the Z buffer is not updated).

Figure 24:
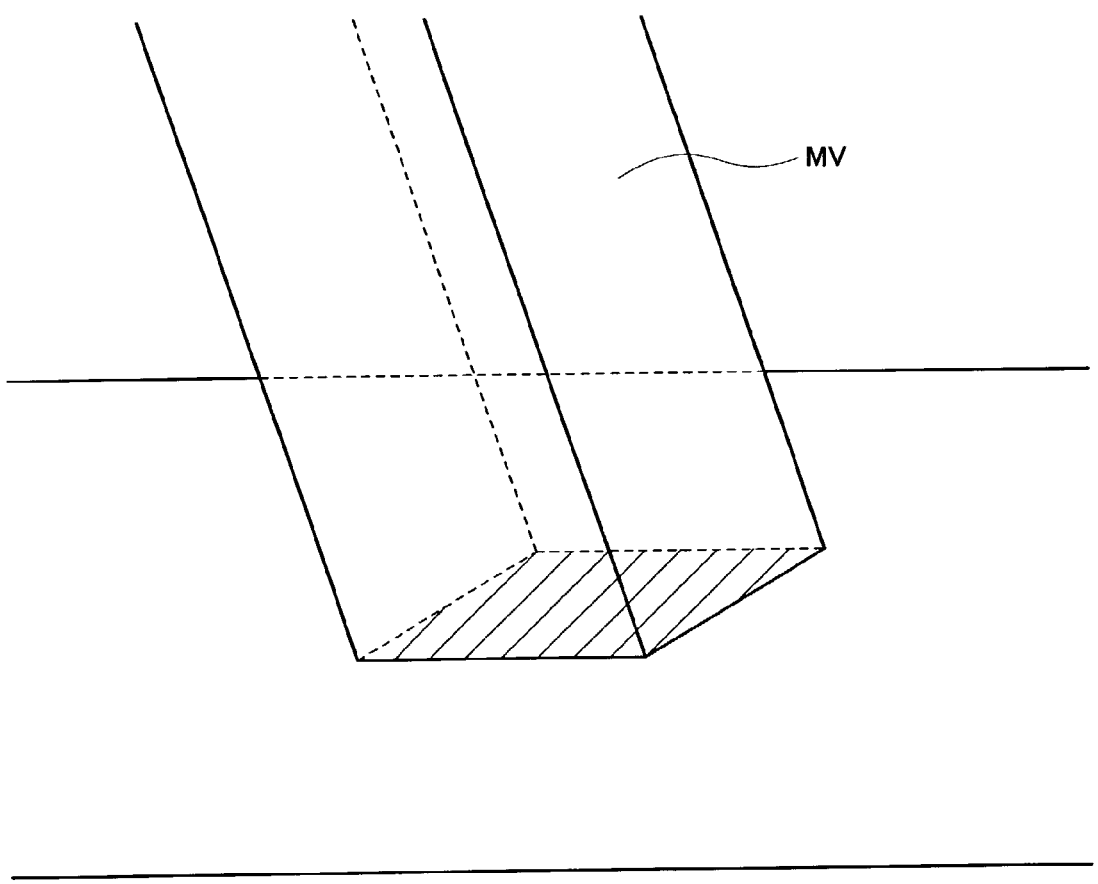
FIG. 24 illustrates details of a process according to the embodiment.

Thus, the value of the stencil buffer will not become the maximum, for example, relating to a pixel (part) diagonally shaded in FIG. 24.

It is then judged whether or not all objects have been processed (step S7). If not so, the procedure returns to the step S4.

On the other hand, if all the objects have been processed, it is then judged whether or not there is a pixel (part) of which value of the stencil buffer is not maximum. If so, the attribute changing process (including the brightness reduction process and the like) is performed relating to that pixel (step S8). That is to say, the attribute changing process is performed on the diagonally shaded pixel of FIG. 24 to generate a shadow or the like.

Figure 20:
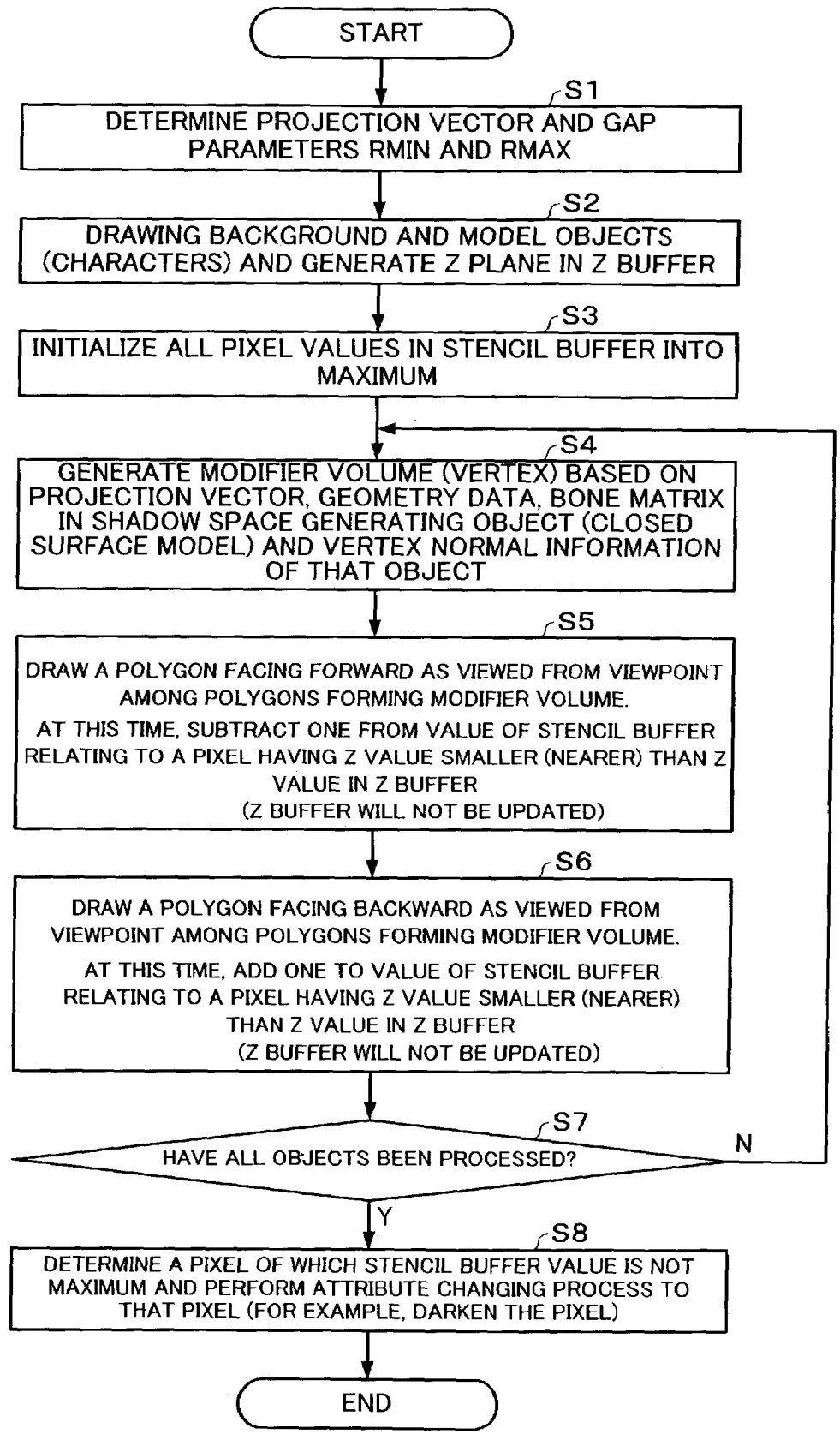
FIG. 20 is a flow chart illustrating the details of a process according to this embodiment.
Figure 21:
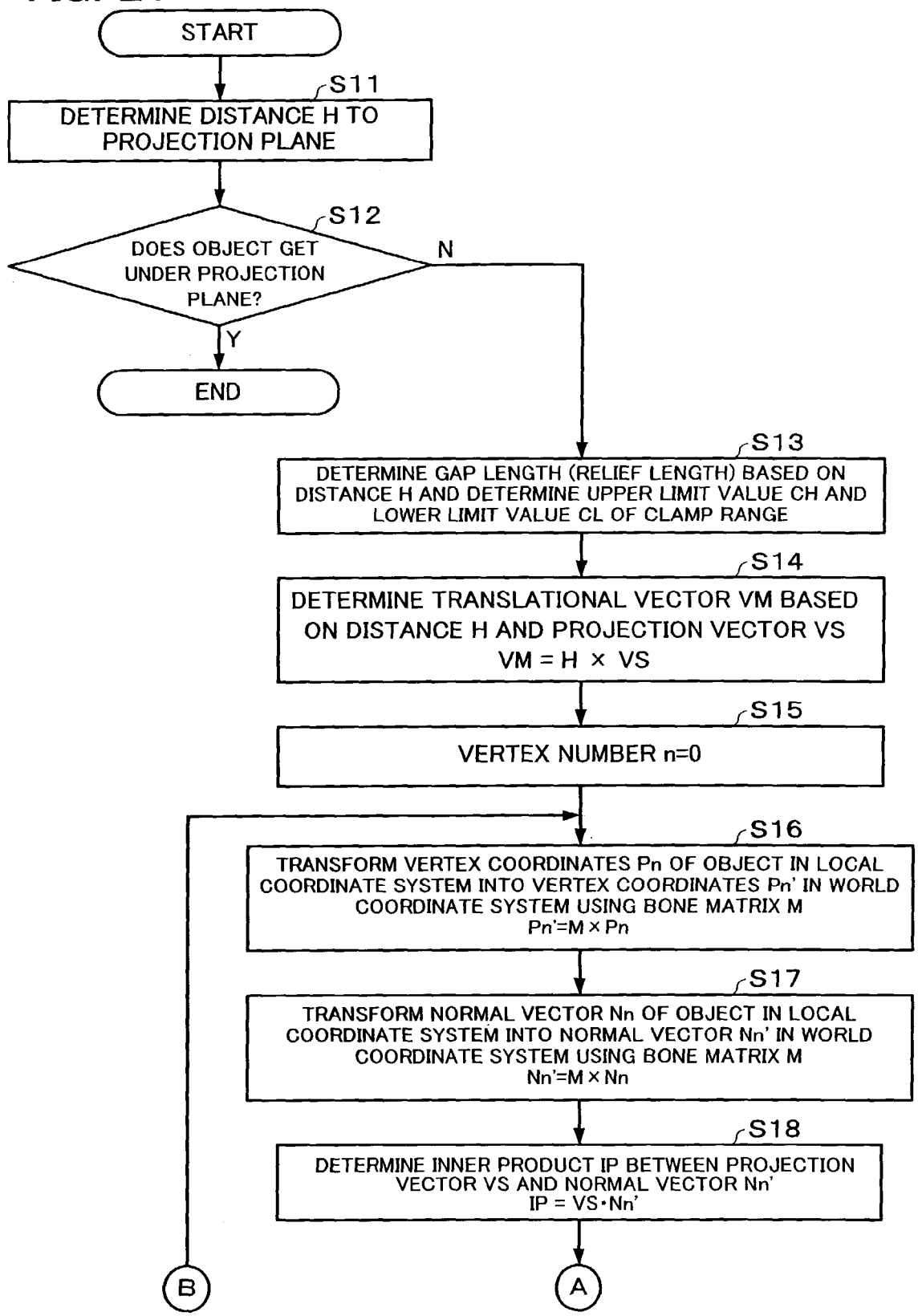
FIG. 21 is a flow chart illustrating details of a process according to the embodiment.
Figure 22:
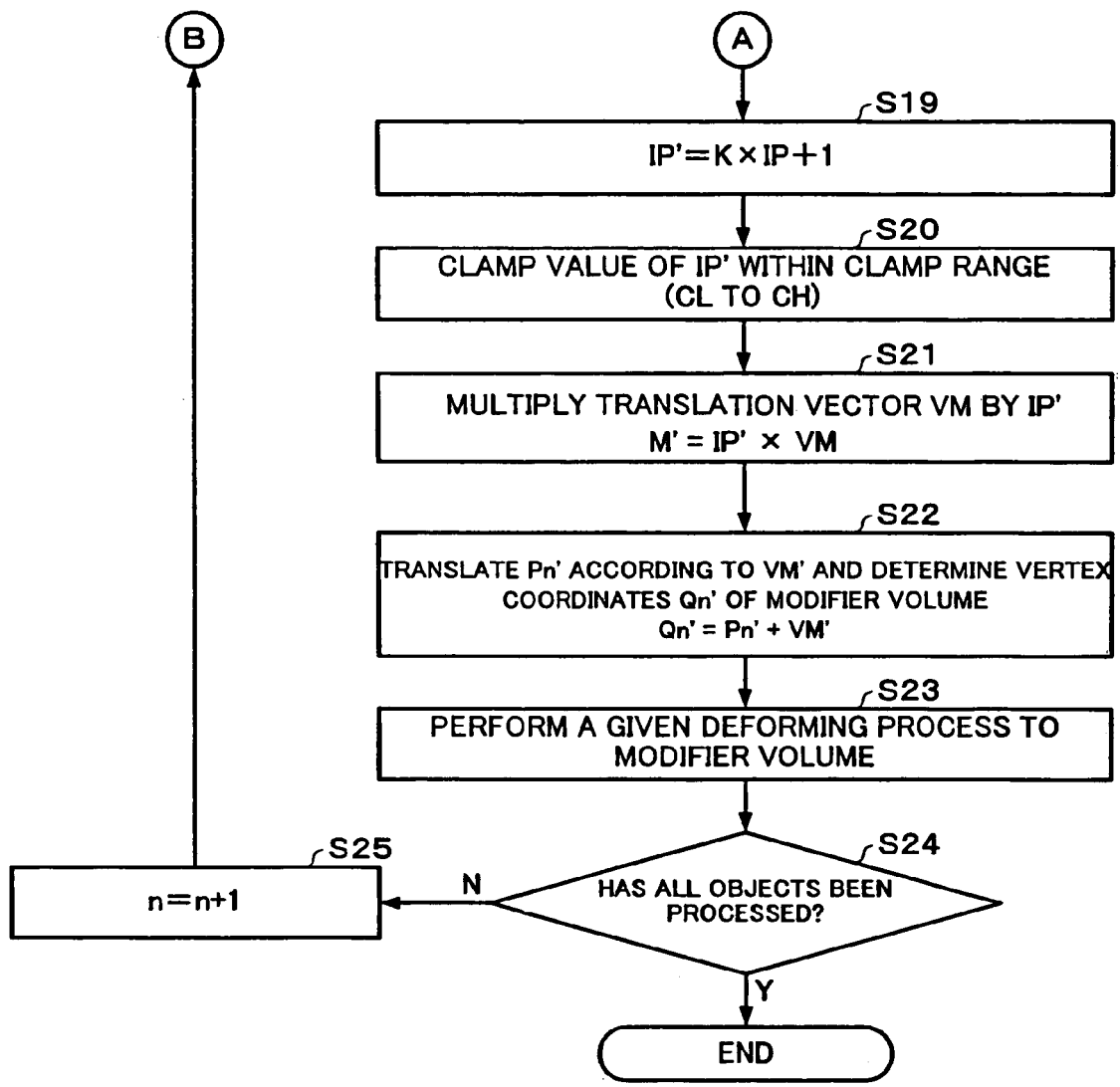
FIG. 22 is a flow chart illustrating details of a process according to the embodiment.

FIGS. 21 and 22 show a flow chart relating to the generation process of modifier volume performed at the step S4 in FIG. 20.

First of all, a distance H to the projection plane is first determined (step S11). It is then judged whether or not an object gets under the projection plane (step S12). If the object gets under the projection plane, the procedure is finished.

If the object does not get under the projection plane, a gap length (or relief length) is then determined based on the distance H while upper and lower limit values CH and CL in a clamp range are determined (step S13, and see FIG. 7).

A translational movement vector VM=H×VS is then determined based on the distance H and the projection vector (step S14). And, the vertex number n is set at zero (step S15).

The bone matrix M is then used to transform vertex coordinates Pn in a local coordinate system for the object into vertex coordinates Pn'=M×Pn in the world coordinate system (step S16).

The bone matrix M is then used to transform a normal vector Nn in the local coordinate system for the object into a normal vector Nn'=M×Nn in the world coordinate system (step S17). The inner product IP=VS×Nn' between the projection vector VS and the normal vector Nn' is then determined (step S18).

However, the projection vector VS may be coordinate-transported from the world coordinate system to the local coordinate system while the inner product between the projection vector VS in the local coordinate system and the normal vector in the local coordinate system may be determined.

IP'=K×IP+1 is then determined (step S19 of FIG. 22). The value of IP' is then clamped within the clamp range (CL to CH) (step S20).

A translational movement vector is then multiplied by IP' to determine VM'=IP'×VM (step S21). Pn' is then translated by VM' to determine vertex coordinates Qn'=Pn'+VM' in the modifier volume (step S22).

A given deformation process is then applied to the modifier volume (step S23).

It is then judged whether or not all objects have been processed (step S24). If not so, n is incremented only by one (step S25) before the procedure returns to the step S16 of FIG. 21.

Figure 23:
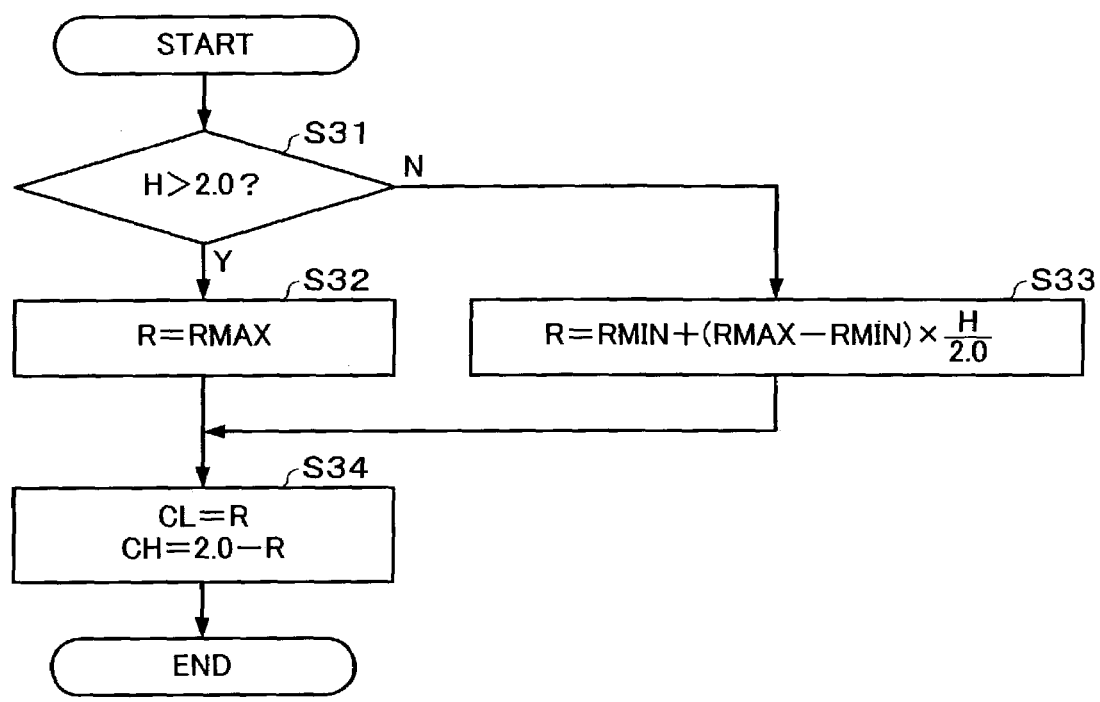
FIG. 23 is a flow chart illustrating details of a process according to the embodiment.

FIG. 23 is a flow chart for a process of determining upper and lower limit values CH and CL in the clamp range as carried out at the step S13 of FIG. 21.

It is first judged whether or not the value H is larger than 2.0 (second value) (step S31). If H>2.0, it is set at R=RMAX (step S32). On the other hand, the event of H≦2.0 sets R=RMIN+(RMAX−RMIN)×H/2.0 (step S33). CL=1.0−R, CH=1.0+R are then set (step S34). It is desirable herein that RMIN and RMAX are determined by the projection vector VS (or Y component VSY in the projection vector).

Figure 25:
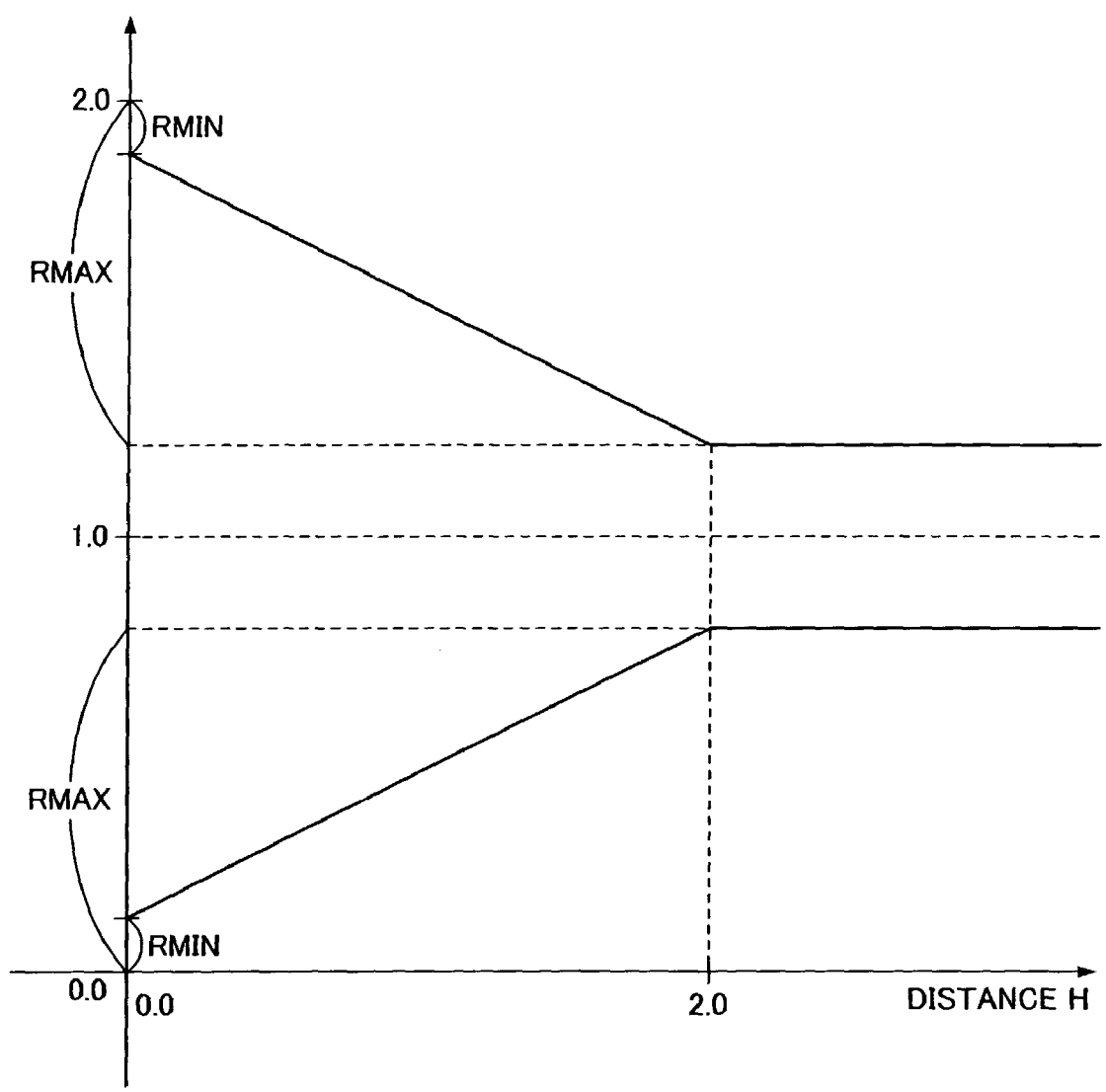
FIG. 25 illustrates details of a process according to the embodiment.

Thus, such upper and lower limit values CH and CL as shown in FIG. 25 can be determined to enable a proper clamping of IP'.

Figure 26:
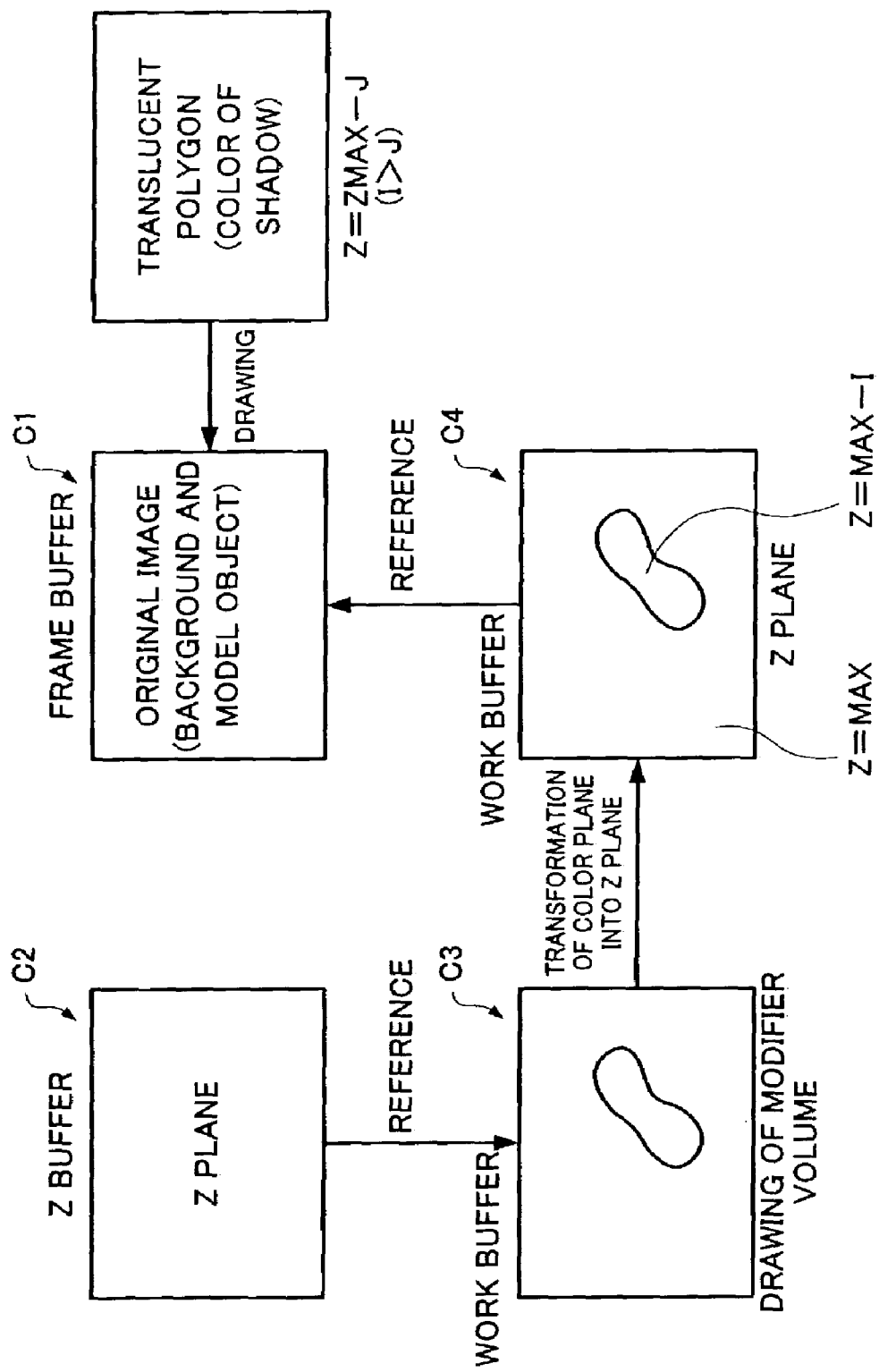
FIG. 26 illustrates a technique used when a hardware of an image generating system does not support a stencil buffer.

If the hardware of the image generating system does not support a stencil buffer, such a technique as shown in FIG. 26 may be taken.

That is to say, an original image (including a background and a model object) is first drawn in the frame buffer and a Z plane corresponding to this original image is prepared in the Z buffer, as shown by C1 and C2 of FIG. 26.

A modifier volume (or primitive faces forming the modifier volume) is then drawn while referring to the Z plane of this C1, as shown by C3.

The color plane of C3 is then transformed to generate such a Z plane as shown by C4. In this Z plane, Z=ZMAX−1 is set at a region in which a shadow is formed while Z=ZMAX is set at a region in which no shadow is formed (when the Z value increases backward of the viewpoint).

A translucent polygon having a screen size on which the color of the shadow has been set is then subjected to α-blending while referring to the Z plane of C4. At the same time, the original image is drawn in the frame buffer. In this case, the Z value of the translucent polygon has been set at Z=ZMAX−J (1>J). In a region which has been set at Z=ZMAX−1 in the Z plane of C4, therefore, the translucent polygon for the shadow's color will be drawn while being subjected to α-blending. On the other hand, the translucent polygon for the shadow's color will not be drawn through the hidden-surface removal in a region which has been set at Z=ZMAX in the Z plane of C4. Thus, the shadow image can be generated only for the region set at Z=ZMAX−1.

4. Hardware Configuration

Figure 27:
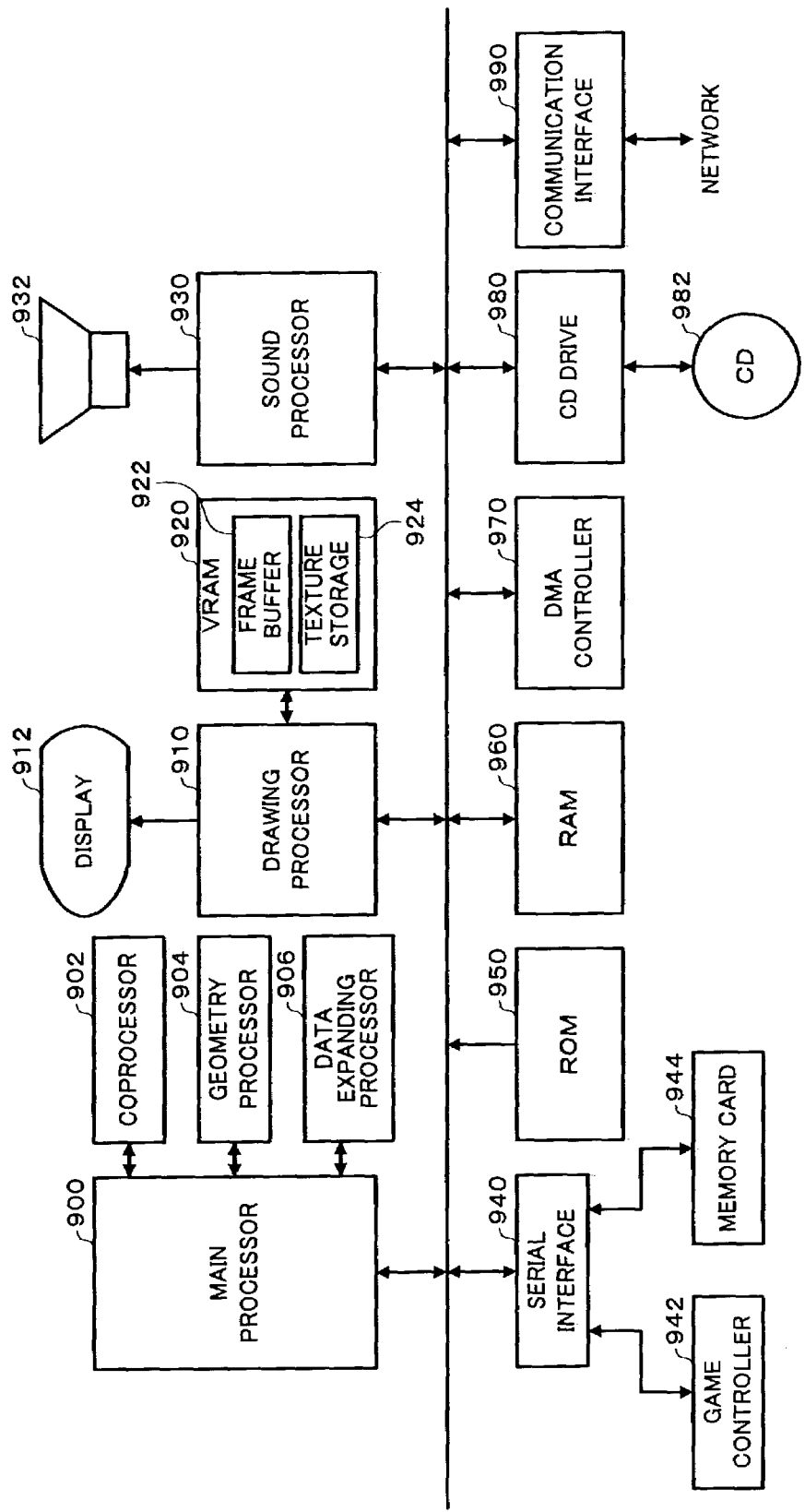
FIG. 27 shows an example of a hardware configuration capable of realizing the embodiment.

A hardware configuration which can be realized by this embodiment will now be described with reference to FIG. 27.

A main processor 900 operates to execute various processings such as game processing, image processing, sound processing and other processings according to a program stored in a CD (information storage medium) 982, a program transferred through a communication interface 990 or a program stored in a ROM (one of the information storage media) 950.

A co-processor 902 is to assist the processing of the main processor 900 and has a product-sum operator and analog divider which can perform high-speed parallel calculation to execute a matrix (or vector) calculation at high speed. If a physical simulation for causing an object to move or act (motion) requires the matrix calculation or the like, for example, the program running on the main processor 900 instructs (or asks) that processing to the co-processor 902.

A geometry processor 904 is to perform a geometry processing such as coordinate transformation, perspective transformation, light source calculation, curve formation or the like and has a product-sum operator and analog divider which can perform high-speed parallel calculation to execute a matrix (or vector) calculation at high speed. For the coordinate transformation, perspective transformation, for example, a light source calculation, the program running on the main processor 900 instructs that processing to the geometry processor 904.

A data expanding processor 906 is to perform a decoding process for expanding image and source compressed data or a process for accelerating the decoding process in the main processor 900. In the opening, intermission, ending or game scene, thus, an MPEG compressed animation may be displayed. However, the image and sound data to be decoded may be stored in the storage devices including ROM 950 and CD 982 or may externally be transferred through the communication interface 990.

A drawing processor 910 is to draw or render an object constructed by primitives (primitive faces) such as polygons or curved surfaces at high speed. On drawing the object, the main processor 900 uses the function of a DMA controller 970 to deliver the object data to the drawing processor 910 and also to transfer the texture to the texture storage section 924, if necessary. Thus, the drawing processor 910 draws the object in a frame buffer 922 at high speed while performing the hidden-surface removal by the use of a Z buffer or the like, based on these object data and texture. Additionally, the drawing processor 910 can also perform α-blending (or translucency processing), depth cueing, mip-mapping, fog processing, bi-linear filtering, try-linear filtering, anti-aliasing, shading and so on. As the image for one frame is written into at the frame buffer 922, that image is then displayed on a display 912.

A sound processor 930 includes a multi-channel ADPCM sound source or the like for generating high-quality game sounds such as BGMs, effect sounds, voices and the like. The generated game sounds are then output through a speaker 932.

Control data from a game controller 942 (such as a lever, a button, a housing, a pad type controller or a gun type controller), saved data from a memory card 944 and personal data are transferred through a serial interface 940. A ROM 950 has stored a system program and so on. In arcade game systems, however, ROM 950 functions as an information storage medium for storing various programs. A hard disk may be used instead of the ROM 950.

RAM 960 is used as a working area for various processors.

DMA controller 970 controls DMA transfer between the processors and the memories (or RAM, VRAM, ROM and the like).

CD drive 980 drives the CD (or information storage medium) 982 stored programs, image data or sound data to enable access to these programs and data.

A communication interface 990 is one for performing data transfer between the game system and any external instrument through a network. In this case, a network connecting to the communication interface 990 may include a telecommunication line (such as analog telephone line or ISDN) and a high-speed serial bus. Data transfer can be carried out through Internet by using the telecommunication line. Additionally, the data transfer between the present image generating system and any other image generating systems can be carried out when the high-speed serial bus is used.

All the means of this embodiment may be executed only through hardware or only through a program which has been stored in an information storage medium or which is distributed through the communication interface. Alternatively, they may be executed both through both the hardware and program.

If all the means of this embodiment are executed both through the hardware and program, the information storage medium will have stored a program for causing the hardware (or computer) to function as the respective means of this embodiment. More particularly, the aforementioned program instructs the processings to the processors 902, 904, 906, 910, 930 and so on all of which are hardware and delivers the data, if necessary. Each of the processors 902, 904, 906, 910, 930 and so on will realize the corresponding one of the functional sections of the present invention, based on the instructions and delivered data.

Figure 28A:
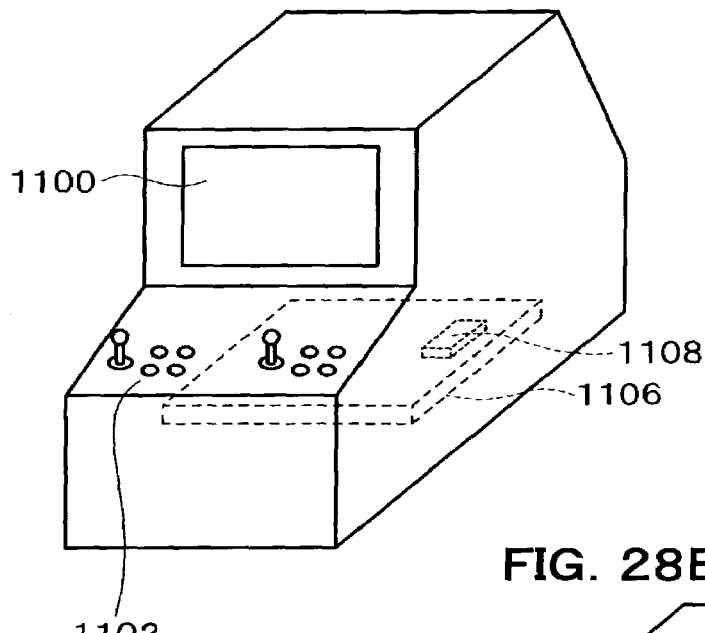
FIGS. 28A, 28B and 28C illustrate examples of various forms of systems to which the embodiment can be applied.

FIG. 28A shows an arcade game system (or image generating system) to which this embodiment is applied. Players enjoy a game by operating a control section 1102 (including levers and buttons) while viewing a game scene displayed on a display 1100. A system board (or circuit board) 1106 included in the game system includes various processors and memories which are mounted thereon. The program (data) for realizing all the sections of this embodiment (data) has been stored in a memory 1108 on the system board 1106, which memory is an information storage medium. This program will be referred to "stored program (or stored information).

Figure 28B:
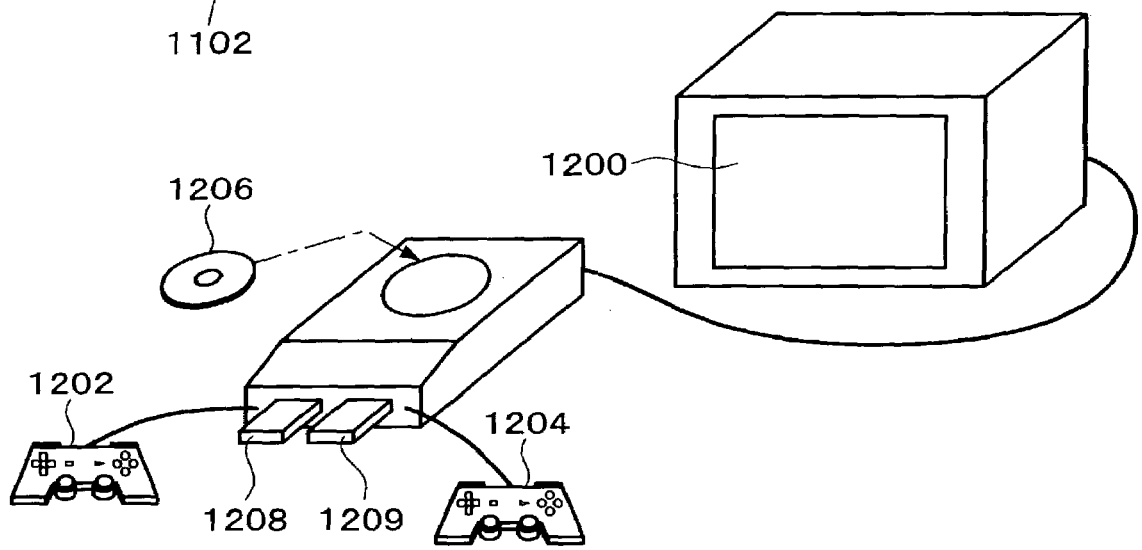

FIG. 28B shows a home game system (or image generating system) to which this embodiment is applied. A player enjoys a game by operating controllers 1202 and 1204 while viewing a game scene displayed on a display 1200. In this case, the aforementioned stored program (or stored information) has been stored in a CD 1206 or memory cards 1208 and 1209 each of which is an information storage medium removably mounted in the main system body, for example.

Figure 28C:
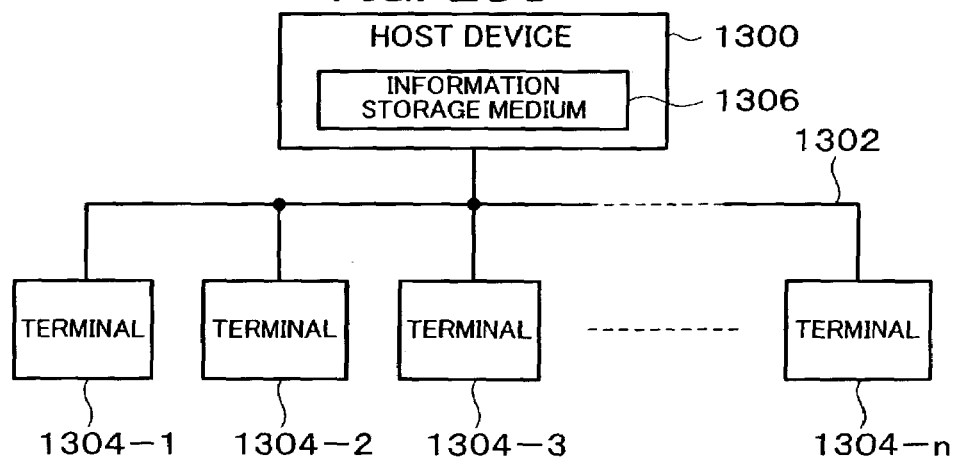

FIG. 28C shows an example wherein this embodiment is applied to a game system which includes a host device 1300 and terminals 1304-1 to 1304-n (game machines or portable telephones) connected to the host device 1300 through a network (which is a small-scale network such as LAN or a global network such as INTERNET) 1302. In such a case, the aforementioned stored program (or stored information) has been stored, for example, in an information storage medium 1306 which can be controlled by the host device 1300, such as a magnetic disk unit, a magnetic tape unit or a memory. If each of the terminals 1304-1 to 1304-n can generate game images and sounds in the standalone manner, a game program and the like for generating game images and sounds will be delivered from the host device 1300 to that terminal. On the other hand, if each of the terminals cannot generate the game images and sounds in the standalone manner, the host device 1300 generates game images and sounds which are in turn transmitted to that terminal.

In the arrangement of FIG. 28C, however, the respective sections of this embodiment may be realized by decentralizing them into the host device (or server) and terminals. Furthermore, the aforementioned stored program (or stored information) for realizing the respective sections of this embodiment may have been stored to distribute them into the information storage medium of the host device (or server) and the information storage media of the terminals.

Additionally, each of the terminals connecting to the network may be either of a home game system or an arcade game system.

The present invention is not limited to the aforementioned embodiment, but may similarly be carried out in any one of various other forms.

For example, the terms referred to as broad terms described in this specification (such as first vector, first plane, attribute changing process, primitive face, object and the like) include projection vector, projection plane, brightness reduction process, polygon, model object, part object, bounding volume and the like, but they can be replaced by the other broad terms in the other part of this specification.

Furthermore, the technique of setting the modifier volume is not limited to such techniques as described in detail in connection with FIG. 4–FIG. 25, but may be carried out in any one of various other forms.

Additionally, the provision of gap region between the object and the modifier volume may be accomplished by setting a modifier volume through the first, second and other techniques described in connection with FIG. 2A to FIG. 3, rather than the technique of FIG. 4. If these first and second techniques are adopted, it can be carried out, for example, that the generated modifier volume is moved by the distance equal to the gap length in the direction of first vector (or projection vector) or that the same is scaled and deformed by the distance equal to the gap length in the direction of first vector.

Additionally, the invention relating to any one of the depending claims may be configured omitting part of the components in any claim on which that depending claim depends. The primary part of the invention relating to one independent claim may depend on any other independent claim.

The present invention may be applied to any of various games such as fighting games, competition games, shooting games, robot combat games, sports games, roll-playing games and so on.

Furthermore, the present invention can be applied to various image generating systems (or game systems) including arcade game systems, home game systems, large-scale attraction systems in which a great number of players play, simulators, multi-media terminals, game image generating system boards and so on.

What is claimed is:

1. An image generating method of generating an image which is visible from a given viewpoint in an object space, comprising:
    setting a modifier volume for an object based on information of the object;
    performing a surface attribute changing process to other objects in a space specified by the modifier volume, based on the set modifier volume,
    setting the modifier volume so that a gap region is formed between the object and the modifier volume; and
    changing a gap length of the gap region according to a distance between the object and a first plane, wherein the formed gap region exists regardless of a field of view of the given viewpoint.

2. The image generating method as defined in claim 1, further comprising:
    increasing the gap length of the gap region as the distance between the object and the first plane increases.

3. The image generating method as defined in claim 1, further comprising:
    drawing a background and a plurality of model objects, then drawing the modifier volume corresponding to each of the model objects.

4. The image generating method as defined in claim 1, further comprising:
    moving vertexes of the object shaped three-dimensionally in a direction of a given first vector in a maimer that moving distance of the vertexes differing from one another, so as to deform the object in the direction of the first vector, and setting the deformed object as the modifier volume.

5. The image generating method as defined in claim 4, further comprising:
    moving each of the vertexes of the object in a manner that the moving distance of each of the vertexes becomes larger as an angle between the first vector and a normal vector of each of the vertexes of the object becomes smaller.

6. The image generating method as defined in claim 4, further comprising:
    increasing the moving distance of each of the vertexes as a distance between a representative point of the object or each of the vertexes and a first plane increases.

7. An image generating method of generating an image which is visible from a given viewpoint in an object space, comprising:
    setting a modifier volume for an object based on information of the object;
    performing attribute changing process to a space specified by the modifier volume, based on the set modifier volume;
    setting the modifier volume so that a gap region is formed between the object and the modifier volume; and
    moving vertexes of the object so that $Q=P+H\times(K\times IP+1)\times VS$ is satisfied where P (PX, PY, PZ) represents coordinates of each of the vertexes before being moved; Q (QX, QY, QZ) represents coordinates of each of the vertexes after being moved; VS (VSX, VSY, VSZ) represents a first vector; IP represents an inner product between the first vector and a normal vector of each of the vertexes of the object; K represents a coefficient to be multiplied by IP; and H represents a distance parameter between a representative point of the object or each of the vertexes and a first plane.

8. The image generating method as defined in claim 7, wherein the coefficient K is set at a value larger than one.

9. The image generating method as defined in claim 7, further comprising:
    clamping values of the inner product IP within a given range.

10. A computer-readable medium including a program for generating an image that is visible from a given viewpoint in an object space, the program causing a computer to realize:
    a modifier volume setting process of setting a modifier volume for an object based on information of the object; and,
    a surface attribute changing process of changing a surface attribute relating to other objects in a space specified by the modifier volume, based on the set modifier volume,
    wherein the modifier volume setting process sets the modifier volume so that a gap region is formed between the object and the modifier volume;
    wherein the modifier volume setting process changes a gap length of the gap region according to a distance between the object and a first plane; and
    wherein the formed gap region exists regardless of a field of view of the given viewpoint.

11. The computer-readable medium as defined in claim 10,
    wherein the modifier volume setting process increases the gap length of the gap region as the distance between the object and the first plane increases.

12. The computer-readable medium as defined in claim 10,
    wherein a background and a plurality of model objects are drawn and then, the modifier volume corresponding to each of the model objects is drawn.

13. The computer-readable medium as defined in claim 10, wherein the modifier volume setting process moves vertexes of the object shaped three-dimensionally in a direction of a given first vector in a manner that moving distance of the vertexes differing from one another, so as to deform the object in the direction of a first vector, and sets the deformed object as the modifier volume.

14. The computer-readable medium as defined in claim 13,
wherein the modifier volume setting process moves each of the vertexes of the object in a manner that the moving distance of each of the vertexes becomes larger as an angle between the first vector and a normal vector of each of the vertexes of the object becomes smaller.

15. The computer-readable medium as defined in claim 13,
wherein the modifier volume setting process increases the moving distance of each of the vertexes as a distance between a representative point of the object or each of the vertexes and a first plane increases.

16. A computer-readable medium including a program for generating an image that is visible from a given viewpoint in an object space, the program causing a computer to realize:
a modifier volume setting process of setting a modifier volume for an object based on information of the object; and,
an attribute changing process of changing an attribute relating to a space specified by the modifier volume, based on the set modifier volume,
wherein the modifier volume setting process sets the modifier volume so that a gap region is formed between the object and the modifier volume; and
wherein the modifier volume setting process moves vertexes of the object so that $$Q=P+H\times(K\times IP+1)\times VS$$

is satisfied where P (PX, PY, PZ) represents coordinates of each of the vertexes before being moved; Q (QX, QY, QZ) represents coordinates of each of the vertexes after being moved; VS (VSX, VSY, VSZ) represents a first vector; IP represents an inner product between the first vector and a normal vector of each of the vertexes of the object; K represents a coefficient to be multiplied by IP; and H represents a distance parameter between a representative point of the object or each of the vertexes and a first plane.

17. The computer-readable medium as defined in claim 16,
wherein the modifier volume setting process sets the coefficient K at a value larger than one.

18. The computer-readable medium as defined in claim 16,
wherein the modifier volume setting process clamps values of the inner products IP within a given range.

* * * * *